United States Patent
Harada et al.

(10) Patent No.: US 6,816,146 B2
(45) Date of Patent: Nov. 9, 2004

(54) ELECTROPHORETIC DISPLAY LIQUID AND ELECTROPHORETIC DISPLAY MEDIUM AND DEVICE USING THE LIQUID HAVING PREDETERMINED DIFFERENT VOLUME MEDIUM PARTICLE DIAMETERS

(75) Inventors: Shigeyuki Harada, Shizuoka-ken (JP); Mitsunobu Morita, Shizuoka-ken (JP); Kunio Hayakawa, Shizuoka-ken (JP)

(73) Assignee: Ricoh Company Limited, Tokyo (JP)

( * ) Notice: Subject to any disclaimer, the term of this patent is extended or adjusted under 35 U.S.C. 154(b) by 464 days.

(21) Appl. No.: 09/741,339

(22) Filed: Dec. 21, 2000

(65) Prior Publication Data

US 2001/0005567 A1 Jun. 28, 2001

(30) Foreign Application Priority Data

Dec. 21, 1999 (JP) .......................... 11-363059

(51) Int. Cl.$^7$ ................................. G09G 3/34
(52) U.S. Cl. .................... 345/107; 345/88; 349/89; 430/38
(58) Field of Search .......................... 345/88, 84, 107, 345/204; 430/32, 37, 38; 359/290, 291, 292, 240; 349/86, 89, 90, 183

(56) References Cited

U.S. PATENT DOCUMENTS

| | | | | |
|---|---|---|---|---|
| 3,870,517 A | * | 3/1975 | Ota et al. ..................... | 430/38 |
| 4,272,596 A | * | 6/1981 | Harbour et al. ............... | 430/37 |
| 6,025,896 A | * | 2/2000 | Hattori et al. ................ | 349/86 |
| 6,113,810 A | * | 9/2000 | Hou et al. .................... | 252/572 |
| 6,239,896 B1 | * | 5/2001 | Ikeda .......................... | 359/240 |
| 6,287,485 B1 | * | 9/2001 | Akashi et al. ................ | 252/583 |
| 6,407,763 B1 | * | 6/2002 | Yamaguchi et al. ......... | 347/112 |

FOREIGN PATENT DOCUMENTS

| JP | 59165028 | 9/1984 |
|---|---|---|
| JP | 62296124 | 11/1987 |
| JP | 62296127 | 12/1987 |
| JP | 62299824 | 12/1987 |
| JP | 63008637 | 1/1988 |
| JP | 63-50886 | 3/1988 |
| JP | 01086116 | 3/1989 |
| JP | 10149117 | 6/1998 |

OTHER PUBLICATIONS

U.S. patent application Ser. No. 09/741,339, Harada, et al., filed Dec. 21, 2000.
U.S. patent application Ser. No. 10/379,906, Harada, et al., filed Mar. 6, 2003.

* cited by examiner

*Primary Examiner*—Amr Awad
(74) *Attorney, Agent, or Firm*—Oblon, Spivak, McClelland, Maier & Neustadt, P.C.

(57) ABSTRACT

An electrophoretic display material and apparatus is disclosed, including a dispersion medium, a white particulate material having a volume median particle diameter Dw, and a colored particulate material having a color different from the color of the white particulate material and a volume median particle diameter Dc, and wherein a ratio Dc/Dw is from 1/1 to 1/50.

41 Claims, 5 Drawing Sheets

ELECTROPHORETIC DISPLAY LIQUID AND ELECTROPHORETIC DISPLAY MEDIUM AND DEVICE USING THE LIQUID HAVING PREDETERMINED DIFFERENT VOLUME MEDIUM PARTICLE DIAMETERS

CROSS-REFERENCE TO RELATED APPLICATIONS AND PUBLICATIONS

This application claims priority under 35 U.S.C. 119, and contains subject matter related to Japanese Patent Application No. 11-363059, filed on Dec. 21, 1999, the entire contents of which are incorporated herein by reference.

BACKGROUND OF THE INVENTION

1. Field of the Invention

The present invention relates to an electrophoretic display liquid, which reversibly changes its optical properties upon application of an electric field thereto. In addition, the present invention relates to an electrophoretic display medium and device using the display liquid.

2. Discussion of the Background

Electrophoretic display media in which image displaying and image erasing can be performed by applying an electric field thereto while controlling the electric field are well know as reversible image displaying media. Electrophoretic display media (hereinafter referred to as display media) attract considerable attention because of having the following advantages:

(1) images formed in the display media can be used as a memory (i.e., images can be read even when application of an electric field to the display media is stopped);

(2) the display media consume relatively low electricity because the media do not consume electricity when an image displayed is maintained; and (3) images formed in the display media have an angle of visual field as wide as general printed documents (i.e., the images can be easily observed even at a point such that an angle formed by the point and the normal line of the display plane is large).

Typical electrophoretic display media have a closed cell in which two electrodes, at least one of which is transparent, face each other with one or more spacers therebetween and which includes an electrophoretic display liquid including a dispersion medium and a particulate pigment dispersed in the dispersion medium in which a dye is dissolved and whose color is different from the color of the colored pigment. A white pigment such as titanium oxide or zinc oxide is typically used as the colored pigment, and a liquid such as xylene, perchloroethylene or isoparaffin is typically used as the dispersion medium. In the dispersion medium, a dye having a color largely different from the white pigment, a surfactant and the like material is typically included.

When the opposed electrodes apply an electric field to the display liquid, the white pigment moves toward one of the electrodes of the cell, and thereby the one of the electrodes achieves a white color state and the other electrode achieves a color state whose color is the same as that of the dispersion medium (i.e., the color of the dye). When an opposite electric field is applied thereto, the colored pigment moves toward the opposite electrode, and thereby the opposite electrode achieves a white color state. Therefore, such electrophoretic display media can provide visible images using the color difference between the colored pigment and colored dispersion medium. Japanese Laid-Open Patent Publications Nos.48-71990,48-71991, 48-71992 and 59-165028 have disclosed such display media.

In such display media, the formed images have poor contrast because the color of the pigment is displayed as a mixed color of the pigment and the dispersion medium including a dye. The reason of this problem is considered to be that the dye included in the dispersion medium adsorbs the pigment. Therefore, this problem cannot be avoided in such display media.

In attempting to solve this problem, the following methods have been disclosed:

(1) a titanium coupling agent is included in a colored dispersion medium or coated on a colored pigment (Japanese Laid-Open Patent Publication No. 62-296127);

(2) a display liquid in which a particulate resin dyed with a fluorescent dye and a pigment having a color different from the color of the particulate resin are dispersed in a colorless dispersion medium having a high insulation property and a low viscosity (Japanese Laid-Open Patent Publication No. 62-299824); and (3) organodisilazane is included in a colored dispersion medium having a high insulation property or coated on a colored pigment (Japanese Laid-Open Patent Publication No. 638637).

However, these methods cannot fully improve the problem, and therefore the resultant display media are not practically used because of having poor visibility.

In attempting to solve the above-mentioned problem of the display media including a dyed dispersion medium, display media which do not use a dye solution have been proposed. For example, Japanese Laid-Open Patent Publication No. 62-269124 discloses an electrophoretic display medium including a display liquid in which at least two kinds of electrophoretic particles whose colors and electrophoretic properties are different from each other are dispersed in a colorless dispersion liquid having a high insulation property. Since these two kinds of color particles have different electrophoretic properties (i.e., one has a positive polarity and the other has a negative polarity), the particles tend to aggregate due to electric attraction. Therefore, a problem which occurs is that the resultant image has poor contrast because the image has a mixed color thereof. In addition, Japanese Laid-Open Patent Publication No. 63-50886 discloses a display medium including a display liquid in which at least two kinds of electrophoretic particles, whose colors are different from each other and which have electrophoretic properties such that the charge polarity is the same but the electrophoretic speed is different, are included in a colorless dispersion medium having a high insulation property. Since the medium displays images utilizing the difference in electrophoretic speed between the electrophoretic particles which have the same polarity and therefore move in the same direction, the colors of the particles tend to mix, resulting in formation of images having poor contrast (i.e., poor visibility).

In attempting to solve the problem (i.e., formation of aggregates of different color particles) of the above-mentioned display media including two or more kinds of particles having different colors, a medium including a dielectric display liquid, first particles having a charge and a color, and second particles having a charge whose polarity is different from the polarity of the first particles and which repulse the first particles utilizing steric repulsion effect to avoid aggregation, is disclosed in Japanese Patent Publication Kohyo No. 8-510790. However, it is difficult to perfectly avoid aggregation of the first and second particles by such a method. Therefore, images having good contrast cannot be obtained in the medium.

In addition, Japanese Laid-Open Patent Publication No 10-149117 discloses an ink composition including white particles which includes a resin and a white pigment and which is used for a concealment purpose, colored particles and a solvent. The white particles have a median particle diameter not less than 1.5 $\mu$m, and the white pigment is present in the white particles in an amount from 15 to 35% and has a median particle diameter not less then 0.4 $\mu$m. In this ink composition, images are formed and erased by transporting one of the white particles and the colored particles using magnetism. The ink composition is suitable for image display devices which display images using magnetism. However, when the ink composition is used for electrophoretic display devices using electricity, the white pigment present in the white particles charges, resulting in formation of aggregates of the white particles and the colored particles. Therefore, the ink composition cannot display images having good visibility, and is not suitable for an electrophoretic display medium.

In addition, Japanese Laid-Open Patent Publication No. 11-119264 discloses a display medium which includes a pair of opposing electrodes in which a plurality of microcapsules including charged particles dispersed in a dispersion medium. The dispersion state of the charged particles is changed by changing the voltage applied to the display medium, resulting in change of the optical reflection properties of the display medium. Thus the display medium performs display operations. In this display medium, the charged particles have a particle diameter of from 1/1000 to about 1/50 of the particle diameter of the microcapsules and a particle diameter ratio, (volume average particle diameter of the charged particles/number average particle diameter thereof), of from 1 to about 2.

In the publication, a display medium is exemplified which includes microcapsules having a particle diameter of 100 $\mu$m and including positively-charged white particles having an average particle diameter of 3 $\mu$m and a particle diameter ratio of 1.3 and negatively-charged black particles having an average particle diameter of 3 $\mu$m and a particle diameter ratio of 1.3.

However, the display device has a drawback such that the black and white particles aggregate due to electric attraction, resulting in formation of display images having poor contrast (i.e., poor visibility).

An electrophoretic display medium in which microcapsules including a colored dispersion medium and an electrophoretic pigment having a different color and dispersed in the dispersion medium are sandwiched by opposing electrodes is disclosed in Japanese Laid-Open Patent Publication No. 1-86116 (i.e., Japanese Patent No. 2551783). Such a display medium has an advantage in that uneven images due to maldistribution of the particles can be avoided. However, the medium has a drawback in that contrast of images is poor because the pigment adsorbs the dye included in the colored dispersion medium.

Because of these reasons, a need exists for an electrophoretic display liquid and medium which can produce images having high contrast and good visibility.

SUMMARY OF THE INVENTION

Accordingly, an object of the present invention is to provide an electrophoretic display liquid which can reversibly display images having high contrast and good visibility.

Another object of the present invention is to provide an electrophoretic display medium and device, which can reversibly display images having high contrast and good visibility.

Briefly, these objects and other objects of the present invention as hereinafter will become more readily apparent can be attained by an electrophoretic display liquid including at least a dispersion medium, a white particulate material and a colored particulate material having a color different from the white particulate material, wherein the white particulate material and the colored particulate material has a respective volume median particle diameter and wherein the following relationship is satisfied:

$$1/50 \leq Dc/Dw \leq 1/1$$

wherein Dc represents a volume median particle diameter of the colored particulate material and Dw represents a volume median particle diameter of the white particulate material.

The white particulate material is preferably hollow particles having a volume median particle diameter of from 0.2 to 6 $\mu$m.

The colored particulate material is preferably titanium black.

The display liquid may be microencapsulated.

In another aspect of the present invention, an electrophoretic display medium is provided which includes a display cell which is constituted of a pair of opposing substrates with one or more spacers therebetween and which includes the above-mentioned display liquid, wherein the pair of substrates includes an electrode at an inside surface thereof and at least one of the pair of substrates is transparent.

Alternatively, the display cell may be formed by a substrate having an electrode formed on the entire surface thereof and an insulating film which faces the electrode with one or more spacers therebetween. In addition, the display cell may be replaced with a display layer including the microencapsulated display liquid and a binder material.

In a further aspect of the present invention, an electrophoretic display device including the electrophoretic display medium mentioned above and a writing device, which can be attached to the other when information is written in the display medium, is provided. The writing device includes an electric field forming device which can apply an electric field to the display medium and which can change its position along the display medium, to display images therein.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1:
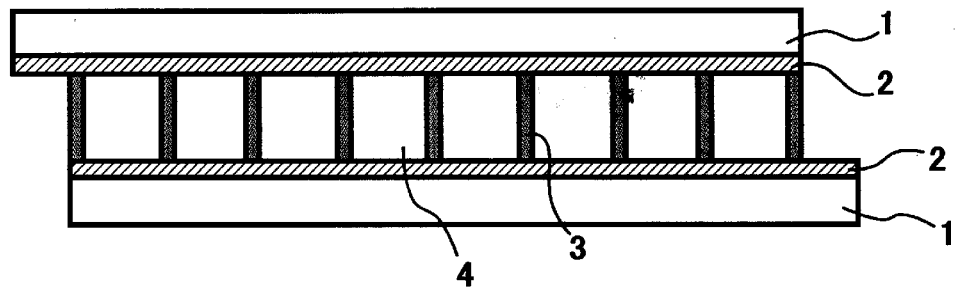
FIGS. 1 to 6 are schematic views illustrating the cross sections of embodiments of the electrophoretic display medium of the present invention.

Other features of the invention will become apparent in the course of the following descriptions of exemplary embodiments which are given for illustrations of the invention and are not intended to be limiting thereof.

Generally, the present invention provides an electrophoretic display liquid including at least a dispersion medium, a white particulate material and a colored particulate material having a color different from the white particulate material, wherein the white particulate material and the colored particulate material have a respective volume median particle diameter and wherein the following relationship is satisfied:

$1/50 \leq Dc/Dw \leq 1/1$ wherein Dc represents a volume median particle diameter of the colored particulate material and Dw represents a volume median particle diameter of the white particulate material.

Preferably the ratio Dc/Dw is from 1/35 to 1/2. The colored particulate material absorbs light having a specific wavelength range, resulting in formation of a color image. The color tone of the displayed image can be freely selected from various colors depending on the use of the display medium. The white and colored particulate materials electrophoretically move in the display liquid by applying an electric field thereto, resulting in formation of a color image.

At this point, the volume median particle diameter of particles means a median particle diameter when measuring the particle diameter distribution of the particles on a volume basis. Namely, the volume median particle diameter of particles is represented as follows:

$D = \exp(\Sigma ndp^3 \ln dp / \Sigma ndp^3)$ wherein n represents the number of the particles, and dp represents a particle diameter of each of the particles.

By using a colored particulate material having a volume median particle diameter of from 1/50 to 1/1, and preferably from 1/35 to 1/2, of that of the white particulate material, images having good contrast can be displayed. When the colored particulate material has a volume median diameter greater than the upper limit (1/1), it is hard to display the white color. Therefore, the displayed image is mainly constituted of the color of the colored particulate material. On the contrary, when the colored particulate material has a volume median diameter less than the lower limit (1/50), it is hard to display the color of the colored particulate material. Therefore, the displayed image is mainly constituted of the white color.

Further, when such a white particulate material and a colored particulate material having the median particle diameters mentioned above are mixed, dynamic interaction caused by the steric hindrance thereof is relaxed, and thereby aggregation of the white and colored particulate materials can be avoided. Therefore, color mixture can be avoided. In addition, such a white particulate material and a colored particulate material are used, the resultant display liquid has high electrophoretic response.

In order to disperse the colored particulate material in a dispersion medium such that the volume median particle diameter is from 1/50 to 1/1 of that of the white particulate material, it is preferable that a proper surfactant is used when the colored particulate material is dispersed in the dispersion medium. In addition, the colored particulate material is preferably dispersed by a supersonic dispersing method or a dispersing method using beads. The thus dispersed colored particulate material hardly has aggregates.

In addition, the white particulate material is preferably dispersed by a supersonic dispersing method or a bead dispersing method together with the colored particulate material. Alternatively the white particulate material may be separately dispersed by one of the above-mentioned dispersing methods and then mixed with the dispersed colored particulate material. It is preferable that the colored particulate material is dispersed by a supersonic dispersing method together with a surfactant for 15 minutes or more, and then the white particulate material is added thereto to disperse the mixture by a bead dispersing method for 20 hours or more.

The white particulate material is preferably a white particulate material having one or more hollows therein. Namely, the white particulate material preferably has one or more spaces therein. The shape of the hollows is not particularly limited, and hollows having spherical, distorted spherical, cylindrical or other shapes are available. In addition, the hollows in a particle may be isolated from each other or connected with other hollows. When the white particulate material is dispersed in a dispersion medium, the hollows are preferably not impregnated with the dispersing liquid, namely the white particulate material preferably maintains air therein. Such a white particulate material can effectively reflect light because there is a large difference in refractive index between the substance constituting the white particulate material whose refractive index is about 1.4 to about 1.6 and air (refractive index of about 1.0) in the hollows. Thus, images having good white color can be displayed.

In the display liquid of the present invention, the white particulate material preferably has a volume median particle diameter of from about 0.2 to about 6 μm, and more preferably from 0.3 to 3.0 μm. When a white particulate material having such a particle diameter is used, images having good contrast can be displayed. In addition, when a white particulate material having such a particle diameter and hollows therein is used, images having better contrast can be displayed.

Suitable materials for use as the white particulate material in the display liquid include hollow particles constituted of organic materials, inorganic materials, or complex materials of organic materials and inorganic materials. Specifically, hollow particles constituted of one or more organic polymers, porous inorganic materials, and hollow particles which are prepared by coating the surface of a porous inorganic material with one or more materials such as resins to form hollows therein can be exemplified as the white particulate material.

Among these particles, hollow particles constituted of one or more organic polymer materials are preferable because of having good dispersibility in a dispersion medium and good light reflection efficiency.

These organic polymer hollow particles and porous particles can be prepared by one of known methods which are described in, for example, "Development of fine polymer particles" (by Toray Research Center), "Application of polymers having fine hollows" (by foray Research Center), and "Technique and application of fine polymer particles" (by CMC).

Specifically, methods utilizing emulsion polymerization, seed emulsion polymerization, soap-free polymerization, or dispersion polymerization; combination methods of suspension polymerization with a foaming operation, seed polymerization with a foaming operation, or seed polymerization with a polymerization shrinkage phenomenon; methods utilizing suspension polymerization of a W/O/W emulsion; methods in which the surface of sprayed liquid drops is dried to form hollow particles; and seed aggregation methods in which electrolyte solid particles are added to a polymer emulsion to aggregate the particles of the emulsion. The manufacturing method of the hollow particles for use in the present invention is not limited thereto.

Suitable materials for use as the polymer of the organic hollow particles or porous particles include known polymers. Specific examples of the materials include polymers and copolymers of styrene, styrene-acrylate, styrene-isoprene, divinyl benzene, methyl methacrylate, methacrylate, ethyl methacrylate, ethyl acrylate, n-butyl acrylate, acryl acid, acrylonitrile, acrylate-methacrylate, ethylene, ethylene-acrylate nylon, silicone, urethane, melamine, benzoguanamine, phenol, fluorine containing compounds (e.g., tetrafluoroethylene), vinylidene chloride, quaternary pyridinium salt, synthetic rubbers, cellulose (e.g., acetyl cellulose), chitosan, calcium alginate, and the like compounds. The polymers constituting hollow particles preferably have good resistance to dispersion media used in the display liquid. These polymers may be crosslinked to improve their solvent resistance. The polymer of the hollow particles is not limited the materials mentioned above.

Specific examples of the hollow particles, which include such a polymer material mentioned above and which are manufactured by one of the above-mentioned methods, include hollow particles of a styrene-acrylate polymer tradenamed as Roapaque manufactured by Rohm and Haas, hollow particles of a crosslinked styrene-acrylic polymer manufactured by Japan Synthetic Rubber Co., Ltd., heat-expansible microcapsules manufactured by Matsumoto Yushi Seiyaku Co., Ltd., and hollow particles tradenamed as Grandoll manufactured by Dainippon Ink and Chemicals, Inc., but are not limited thereto. If hollow particles dispersed in a liquid are used for the display liquid, the hollow particles are preferably added to the dispersion medium after being dried.

Suitable inorganic hollow particles and porous particles for use in the display liquid include known inorganic hollow particles and porous particles prepared by one of the known methods such as methods utilizing adhesion (e.g., powder-bed methods, topo-chemical methods and mechanochemical reaction methods); methods utilizing deposition reaction (e.g., surface precipitation methods, impregnation methods, and interfacial reaction methods); interfacial gelation reaction methods; and hollow forming methods using calcination.

Specific examples of the inorganic hollow particles include silica, magnesium silicate, calcium silicate, strontium silicate, barium silicate, cobalt carbonate, cobalt oxide, cobalt, iron oxide, cobalt-iron carbonate, basic copper carbonate, copper, nickel carbonate and the like, which are prepared by an interfacial reaction method (described in detail in a document "Challenge to design new materials" published in Japan on May 29, 1998); and aluminum oxide, titanium dioxide, and the like prepared by an interfacial gelation reaction method (described in detail in a Japanese magazine Shikizai 70 (2) 84–91, 1997). In addition, inorganic hollow particles which are prepared by calcining an inorganic material to make foams in the particles can also be used. Specific examples of such inorganic hollow particles include foam silica.

In addition, complex particles in which one or more inorganic pigments are adhered to the surface of organic polymer hollow particles or porous polymer particles can also be used as the hollow particles. Specific examples of such complex particles include Ordered Mixture which is complex particles of organic polymer hollow particles and titanium dioxide.

The surface of the hollow or porous particles may be coated with one or more organic polymers by, for example, a coating method (e.g., a Coatmizer Method).

Suitable materials for use as the colored particulate material having a color different from the white particulate material include known colored inorganic and organic particles.

Specific examples of inorganic pigment particles for use as the colored particulate material in the display liquid include cadmium yellow, cadmium lithopone yellow, yellow iron oxide, Titan Yellow, titan barium yellow, cadmium orange, cadmium lithopone orange, molybdate orange, red iron oxide, red lead, silver orange, cadmium red, cadmium lithopone red, amber, brown iron oxide, zinc iron chrome brown, chrome green, chromium oxide, viridian, cobalt green, cobalt chrome green, titan cobalt green, Prussian blue, cobalt blue, ultramarine blue, cerulean blue, cobalt aluminum chrome blue, cobalt violet, mineral violet, carbon black, iron black, manganese ferrite black, cobalt ferrite black, copper chrome black, copper chrome manganese black, black titanium oxide (titanium black), aluminum powder, copper powder, tin powder, zinc powder and the like.

Specific examples of the organic pigment particles for use as the colored particulate material in the display liquid include Fast Yellow, disazo yellow, condensed azo yellow, anthrapyrimidine yellow, isoindoline yellow, copper azomethine yellow, quinophthaloin yellow, benzimidazolone yellow, nickel dioxime yellow, monoazo yellow lake, dinitroaniline orange Pyrazolone Orange, perynone orange, Toluidine Red, Permanent Carmine, Brilliant Fast Scarlet, Pyrazolone Red, Rhodamine 6G Lake, Permanent Red, Lithol Red, BON Lake Red, Lake Red, Brilliant Carmine, Bordeaux 10B, Naphthol Red, Quinacridone Magenta, condensed Azo Red, Naphthol Carmine, perylene scarlet, condensed Azo Scarlet, benzimidazolone carmine, Anthraquinone Red, perylene red, perylene maroon, quinacridone maroon, quinacridone scarlet, quinacridone red, diketopyrrolopyrrole red, benzimidazolone brown, Phthalocyanine Green, Victoria Blue lake, Phthalocyanine Blue, Fast Sky Blue, Alkali Blue Toner, Indanthrene Blue, Rhodamine B Lake, Methyl Violet Lake, dioxazine violet, Naphthol Violet and the like.

Among these pigment particles, black titanium oxide (titan black) is preferably used because of having good visibility and good electrophoretic properties. Black titanium oxide has a formula $Ti_nO_{2n-1}$ and is manufactured by partially deoxidizing titanium dioxide. In general, black titanium oxide is manufactured by calcining titanium dioxide and titanium in a vacuum condition. The titanium oxide having a formula $Ti_nO_{2n-1}$ has a color of from a dark color such as a bronze color, violet black or blue black to a gray color depending on the number of "n". By using such titanium oxides alone or in combination, various colored pigment particles can be prepared.

The surface of these pigment particles may be reformed. Suitable reforming methods include coating methods in which one or more materials such as polymers are coated on the surface of color particles; methods in which color particles are treated with one or more coupling agents such as titanate compounds and silane compounds; methods in which color particles are subjected to a graft polymerization treatment; and the like. In addition, the colored particulate material for use in the display liquid may be subjected to a mechanochemical treatment. Further, complex particles in which two or more of these colored particulate materials are combined; and complex particles in which one or more of these colored particulate materials are combined with one or more of the particulate polymer materials or hollow polymer materials mentioned above can also be used.

Suitable materials for use as the dispersing medium in the display liquid include aromatic hydrocarbons such as benzene, toluene, xylene, phenylxylyl ethane, diisoproyl naphthalene, and naphthene type hydrocarbons; aliphatic hydrocarbons such as hexane, dodecylbenzene, cyclohexane, kerosine, and paraffin type hydrocarbons; halogenated hydrocarbons such as chloroform, trichloroethylene, tetrachloroethylene, trifluoroethylene, tetrafluoroethylene, dichloromethane, and ethyl bromide; phosphates such as tricresyl phosphate, trioctyl phosphate, octyldiphenyl phosphate, and tricyclohexyl phosphate; phthalates such as dibutyl phthalate, dioctyl phthalate, dilauryl phthalate, dicyclohexyl phthalate; carboxylic acid esters such as butyl oleate, diethyleneglycol dibenzoate, dioctyl sebacate, dibutyl sebacate, dioctyl adipate, trioctyl trimellitate, acetyltriethyl citrate, octyl maleate, and ethyl acetate; diisopropyl naphthalene, 1,1-ditolyl ethane, 1,2-ditolyl ethane, 2,4-di-t-amino phenol, N,N-dibutyl-2-butoxy-5-toctyl aniline, and the like liquids. The dispersion medium is not limited thereto. In addition, these materials can be used alone or in combination.

In the present invention, electrophoretic display particles including microcapsules which include therein at least a dispersion medium, a white particulate material, and a colored particulate material having a color different from the white particulate material (i.e., microcapsules including the display liquid of the present invention mentioned above) can be used for the display medium. By using such microcapsules for the display medium, the resultant display medium has the following advantages:

(1) the display liquid is divided into a plurality of micro domains (i.e., the display liquid is contained in the micro spaces in the microcapsules), the resultant display medium can maintain good visibility; and (2) since the microcapsules are easy to handle because the display liquid can be handled as a solid material, the electrophoretic display medium can be easily manufactured.

In the microcapsule display particles (hereinafter microencapsulated display liquid of the present invention, the display liquid of the present invention which includes a dispersion medium, a white particulate material and a colored particulate material is contained. In this case, it is also preferable that the white particulate material has a volume median particle diameter of from 0.2 to 6 μm, and the colored particulate material preferably has a volume median diameter of from 1/50 to 1/1 of that of the white particulate material. Such a colored particulate material effectively absorbs the light passing through the shell of the microcapsules, resulting in formation of images having good contrast. In addition, such a white particulate material effectively reflects the light passing through the shell of the microcapsules, resulting in also formation of images having good contrast.

Further, such a white particulate material and a colored particulate material are mixed, dynamic interaction caused by the steric hindrance thereof is relaxed, and thereby aggregation of the white and colored particulate materials can be avoided. Therefore, the color mixture problem can be avoided. In addition, such a white particulate material and a colored particulate material are used, the resultant display liquid has high electrophoretic response.

The microencapsulated display liquid preferably has a volume median particle diameter of from 10 to 500 times, and more preferably from 50 to 400 times, the volume median particle diameter of the white particulate material used in the display liquid. When such microencapsulated display liquid is used in the display device, the display device can effectively exhibit the white color of the white particulate material, resulting in formation of images having good visibility.

When the median particle diameter of the microencapsulated display liquid is less than 10 times that of the white particulate material used, the reflectivity of the white particulate material deteriorates and therefore images having good visibility cannot be obtained. On the contrary, when the median particle diameter of the microencapsulated display liquid is greater than 500 times that of the white particulate material used, the moving length of the white and colored particulate materials is lengthened, resulting in increase of interaction between the white and colored particulate materials. Therefore, the electrophoretic response of the resultant display medium seriously deteriorates.

Microcapsules for use in the electrophoretic display particles of the present invention can be prepared by any one of known methods such as in-situ methods, interfacial polymerization methods, coacervation methods and the like. Suitable materials for use as the shell of the microcapsules include polyurethane, polyurea, polyurea-polyurethane, urea-formaldehyde resins, melamine-formaldehyde resins, polyamides, polyesters, polysulfonamides, polycarbonates, polysulfinates, epoxy resins, polyacrylates, polymethacrylates, vinyl acetate, gelatin and the like materials.

When such a display liquid or microcapsules including the display liquid is electrophoresed by applying electric field thereto, the white particulate material and the colored particulate material preferably have different electrophoretic properties. In particular, a combination of a white particulate material which hardly electrophoreses or does not electrophorese and a colored particulate material which electrophoreses actively compared to the white particulate material is preferable.

The reason is as follows:

The white particulate material has relatively small specific gravity because of having one or more hollows therein. Therefore, in the display liquid in which the white particulate material is dispersed in a dispersion medium, the white particulate material tends to be present in an upper portion (an image displaying side) of the display liquid. On the contrary, the colored particulate material tends to be present in a lower portion (a side opposite to the image displaying side).

It is not efficient to move such a white particulate material from the image displaying side to the opposite side or from the opposite side to the image displaying side because of having a relatively large particle diameter. On the contrary, it is efficient to move such a colored particulate material from the opposite side to the image displaying side or from the image displaying side to the opposite side because of having a relatively small particle diameter. The electrophoretic mobility of a particle is inversely proportion to the particle diameter thereof. Therefore, it is preferable that the colored particulate material has higher electrophoretic mobility than the white particulate material.

From this point of view, titanium black is preferable as the colored particulate material because of having high electrophoretic mobility. In addition, organic polymers having one or more hollows are preferable as the white particulate material because of hardly or not exhibiting electrophoretic properties.

The display liquid of the present invention may include additives such as surfactants, protective colloids and the like materials to control the charge quantity or improve the dispersibility of the white and colored particulate materials. The additives are not limited thereto.

Known surfactants, which can dissolve or uniformly dispersed in the dispersion medium, such as nonion surfactants, anion surfactants, cation surfactants and ampholytic surfactants, can be used as the surfactants. These surfactants can be used alone or in combination.

Specific examples of the surfactants are the following but are not limited thereto:

(1) Nonionic Surfactants polyoxyalkylene alkylphenol ethers such as polyoxyethylene nonylphenol ether, polyoxyethylene dinonylphenol ether, polyoxyethylene octylphenol ether, polyoxyethylene styrenated phenol, polyoxyethylene bisphenol A, polyoxyethylene nonylphenyl ether, polyoxyethylene octylphenyl ether, and nonylphenol ethoxylate;

polyoxyalkylene ethers such as polyoxyethylene caster oil, polyoxyalkylene block polymers, polyoxyethylene cetyl ether, polyoxyethylene lauryl ether, polyoxyethylene oleyl ether, polyoxyethylene stearyl ether, and polyoxypropylene ether;

glycols such as monooleic type polyoxyalkylene glycols, diol type polyoxyalkylene glycols, triol type polyoxyalkylene glycols, monool block type polyalkylene glycols, diol block type polyoxyalkylene glycols, and random type polyoxyalkylene glycols;

alkyl alcohol ethers such as primary linear alcohol ethoxylates (e.g., octylphenol ethoxylate, oleyl alcohol ethoxylate and lauryl alcohol ethoxylate), secondary linear alcohol ethoxylates, and polyphenol ethoxylates;

polyoxyalkylene alkyl esters such as polyoxyethylene rosin ester, polyoxyethylene lauryl ester, polyoxyethylene oleyl ester, and polyoxyethylene stearyl ester; sorbitan esters of fatty acids such as sorbitan monolaurate, sorbitan monopalmitate, sorbitan monostearate, sorbit and laurate, sorbit and palmitate, sorbit and stearate, sorbitan sesquilaurate, sorbitan sesquipalmitate, and sorbitan sesquistearate;

polyoxyethylene sorbitan esters such as polyoxyethylene sorbitan monolaurate, polyoxyethylene sorbitan monopalmitate, polyoxyethylene sorbitan monostearate, polyoxyethylene sorbitan dilaurate, polyoxyethylene sorbitan dipalmitate, polyoxyethylene sorbitan distearate, polyoxyethylene sorbitan sesquilaurate, polyoxyethylene sorbitan sesquipalmitate, and polyoxyethylene sorbitan sesquistearate;

fatty acid esters such as saturated fatty acid methyl esters, unsaturated fatty acid methyl esters, saturated fatty acid butyl esters, unsaturated fatty acid butyl esters, saturated fatty acid stearyl esters, unsaturated fatty acid stearyl esters, saturated fatty acid octyl esters, unsaturated fatty acid octyl esters, stearic acid polyethylene glycol esters, oleic acid polyethylene glycol esters, rosin polyethylene glycol esters;

fatty acid and their amides such as stearic acid, oleic acid, palmitic acid, lauric acid, and myristic acid, and their amides;

polyoxyethylene alkyl amine esters such as polyoxyethylene lauryl amine, and polyoxyethylene alkyl amine ethers;

higher fatty acid mono- or all-ethanol amides such as lauric acid monoethanol amide, and coconut fatty acid diethanol amide;

alkyl alkylol amides and alkanol amides such as polyoxyethylene stearic acid amide, and coconut diethanolamide (1-2 type or 1–1 type);

alkanol amines represented by one of the following formulae:

R—(CH₂CH₂O)mH (CH₂CH₂O)nH, and R—NH—C₃H₆—NH₂ wherein R represents a group such as oleyl, octyl, dodecyl, tetradecyl, hexadecyl, octadecyl, coconut oil, tallow oil, soybean oil or the like;

primary amines represented by the following formula:

R—NH₂ wherein R represents a group such as oleyl, octyl, dodecyl, tetradecyl, hexadecyl, octadecyl, coconut oil, tallow oil, soybean oil or the like;

secondary amines represented by the following formula:

R1R2—NH wherein R1 and R2 independently represent a group such as oleyl, octyl, dodecyl, tetradecyl, hexadecyl, octadecyl, coconut oil, tallow oil, soybean oil or the like;

tertiary amines represented by the following formula:

R1R2R3N wherein R1, R2 and R3 independently represent a group such as oleyl, octyl, dodecyl, tetradecyl, hexadecyl, octadecyl, coconut oil, tallow oil, soybean oil or the like; and synthesized higher alcohols and natural higher alcohols;

polymers and oligomers such as acrylic polymers and oligomers, polycarboxylic acid compounds, and hydroxy fatty acid oligomers and their derivatives.

(2) Anionic Surfactants carboxylic acid salts such as polycarboxylic acid type polymer activators, polycarboxylic acid type nonionic activators, fatty acid soaps, and rosin soaps;

salts of sulfuric esters such as salts of sulfuric alcohol esters (e.g., salts of sulfuric caster oil ester, sodium salt of sulfuric lauryl alcohol ester amine salts of sulfuric lauryl alcohol ester, sodium salts of sulfuric natural alcohol esters, and sodium salts of sulfuric higher alcohol esters), amine salts of sulfuric esters of lauryl alcohol ether, sodium salts of sulfuric esters of lauryl alcohol ether, amine salts of sulfuric esters of synthesized higher alcohol ethers, sodium salts of sulfuric esters of synthesized higher alcohol ethers, amine salts of sulfuric esters of alkyl polyethers, sodium salts of sulfuric esters of alkylpolyethers, amine salts of sulfuric esters of adducts of natural alcohols with ethylene oxide, sodium salts of sulfuric esters of adducts of natural alcohols with ethylene oxide, amine salts of sulfuric esters of adducts of synthetic alcohols with ethylene oxide, sodium salts of sulfuric esters of adducts of synthetic alcohols with ethylene oxide, amine salts of sulfuric esters of adducts of alkyl phenols with ethylene oxide, sodium salts of sulfuric esters of adducts of alkyl phenols with ethylene oxide, amine salts of sulfuric esters of polyoxyethylene nonylphenyl ether, sodium salts of sulfuric esters of polyoxyethylene nonylphenyl ether, amine salts of sulfuric esters of polyoxyethylene polyphenyl ether, and sodium salts of sulfuric esters of polyoxyethylene polyphenyl ether;

sulfonic acid salts such as amine salts of alkylarylsulfonic acids, sodium salts of alkylarylsulfonic acids, amine salts of naphthalene sulfonic acid, sodium salts of naphthalenesulfonic acid, amine salts of alkylbenzenesulfonic acids, sodium salts of alkylbenzenesulfonic acids, naphthalenesulfonic acid condensates and naphthalenesulfonic acid condensates of formalin.

sulfonic acid salts of polyoxyalkylenes such as amine salts of sulfonic acid of polyoxyethylene nonylphenyl ether, sodium salts of sulfonic acid of polyoxyethylene nonylphenyl ether, amine salts of sulfonic acid of polyoxyethylene aryl ethers, sodium salts of sulfonic acid of polyoxyethylene aryl ethers, amine salts of sulfonic acid of polyoxyethylene tridecylphenyl ether, sodium salts of sulfonic acid of polyoxyethylene tridecylphenyl ether, amine salts of sulfonic acid of polyoxyethylene alkyl ethers, and sodium salts of sulfonic acid of polyoxyethylene alkyl ethers;

salts of sulfosuccinic esters such as amine salts of dialkyl sulfosucinate, sodium salts of dialkyl sulfosucinate, amine salts of polyphenylpolyethoxy sulfosuccinate, sodium salts of polyphenylpolyethoxy sulfosuccinate, amine salts of sulfosuccinic monoesters of polyoxyethylene alkyl ethers, and sodium salts of sulfosuccinic monoesters of polyoxyethylene alkyl ethers; and phosphoric esters and salts such as alkyl phosphates, alkoxyalkyl phosphates, phosphoric esters of higher alcohols, phosphoric salts of higher alcohols, phosphoric esters of alkylphenols, phosphoric esters of aromatic compounds, phosphoric esters of polyoxyalkylene alkyl ethers, and phosphoric esters of polyoxyalkylene alkylaryl ethers.

(3) Cationic Surfactants quaternary ammonium salts of alkyltrimethyl amines represented by the following formula:

R—N(CH₃)₃X wherein R represents a group such as stearyl, cetyl, lauryl, oleyl, dodecyl, coconut oil, soy bean oil, tallow oil or the like, and X represents a halogen atom, an amino group or the like, quaternary ammonium salts of tetramethyl amines, and quaternary ammonium salts of tetrabutyl amines;

acetic acid salts represented by the following formula:

(RNH₃)(CH₃COO)

wherein R represents a group such as stearyl, cetyl, lauryl, oleyl, dodecyl, coconut oil, soybean oil, tallow oil or the like;

benzylamine type quaternary ammonium salts such as lauryldimethylbenzyl ammonium salts (halogenides or the like), stearyldimethylbenzyl ammonium salts (halogenides or the like), dodecyldimethylbenzyl ammonium salts (halogenides or the like); and polyoxyalkylene type quaternary ammonium salts represented by the following formula:

R(CH₃)N(C₂H₄O)mH(C₂H₄O)n·X wherein R represents a group such as stearyl, cetyl, lauryl, oleyl, dodecyl, coconut oil, soybean oil, tallow oil or the like, and X represents a halogen atom, an amino group or the like.

(4) Amphoteric Surfactants betaine type surfactants, imidazoline type surfactants, β-alanine type surfactants, and hydrochloric salts of polyoctylpolyaminoethyl glycine.

Suitable protective colloid agents include known protective colloid agents which can be stably dissolved or dispersed in the dispersion medium used.

In the present invention, various electrophoretic display media and devices are provided which include the above-mentioned electrophoretic display liquid including a dispersion medium, a white particulate material having a hollow therein and colored particulate material having a color different from the color of the white particulate material. The electrophoretic display media and devices may include microencapsulated display liquid in which the display liquid is contained in microcapsule particles.

Specific examples of the electrophoretic display media are as follows but are not limited thereto:

(1) Display Medium as Shown in FIG. 1

The display medium has a pair of substrates 1. Each of the pair of substrates have an electrode on one side thereof. The pair of substrates 1 are configured so as to face each other with one or more spacers therebetween to form one or more cells. In the cells, the display liquid 4 of the present invention is contained.

Figure 2:
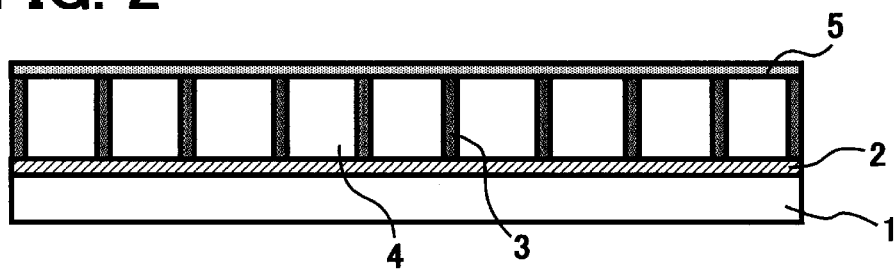

(2) Display Medium as Shown in FIG. 2

The display medium has a substrate 1 having an electrode 2 and an insulating film 5 opposing the substrate 1. The substrate 1 and the insulating film 5 are configured so as to face each other with one or more spacers 3 therebetween to form one or more cells. In the cells, the display liquid 4 of the present invention is contained.

(3) Display Media as Shown in FIG. 1 or 2

In the display media as shown in FIG. 1 or 2, the display media are characterized in that the distance between the electrodes (in FIG. 1) or between the electrode 1 and the insulating film 5 (i.e., the spacing of the cell) is from 20 to 500 times the volume median particle diameter of the white particulate material.

Figure 3:
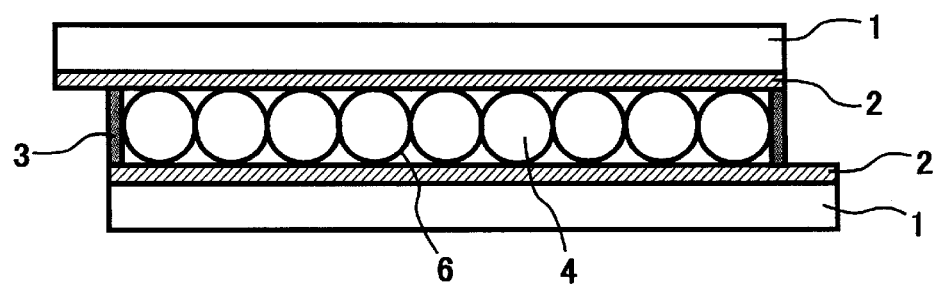

(4) Display Medium as Shown in FIG. 3

The display medium has a pair of substrates 1 each having an electrode 2. The pair of substrates 1 are configured so as to face each other with spacers 3 therebetween to form one or more cells. In the cells, microencapsulated display liquid 6 of the present invention are contained. The microencapsulated display liquid 6 include the display liquid 4 of the present invention.

Figure 4:
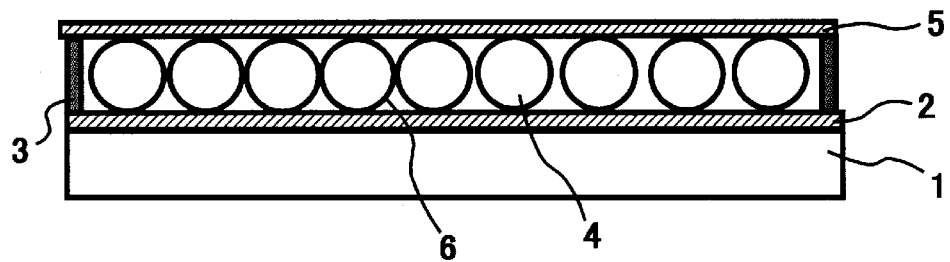

(5) Display Medium as Shown in FIG. 4

The display medium has a substrate 1 having an electrode 2 and an insulating film 5 opposing the substrate. The substrate 1 and the insulating film 5 are configured so as to face each other with one or more spacers 3 therebetween to form one or more cells. In the cells, microencapsulated display liquids including the display liquid of the present invention is contained.

(6) Display Media as Shown in FIG. 3 or 4

In the display media as shown in FIG. 3 or 4, the display media are characterized in that the distance between the electrodes (in FIG. 1) or between the electrode and the insulating film is from once to twice the volume median particle diameter of the microencapsulated display liquid 6 including the display liquid 4 including a dispersion medium, a white particulate material and a colored particulate material.

Figure 5:
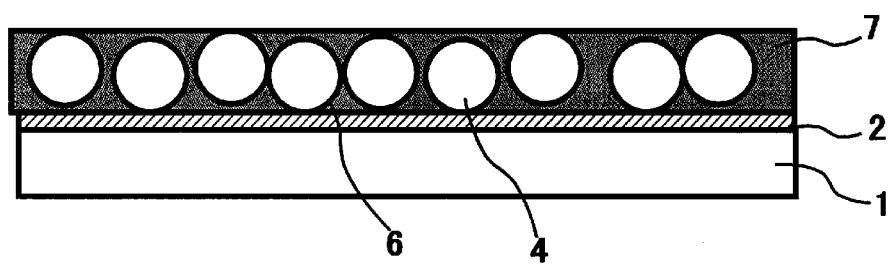

(7) Display Medium as Shown in FIG. 5

The display medium has a substrate 1 having an electrode 2. On the electrodes, a display layer including a binder resin 7 and the microencapsulated display liquid 6 including the display liquid 4 of the present invention.

(8) Display Medium as Shown in FIG. 5

In the display medium as shown in FIG. 5, the average thickness of the display layer is from once to twice the volume median particle diameter of the microencapsulated display liquid 6.

Figure 6:
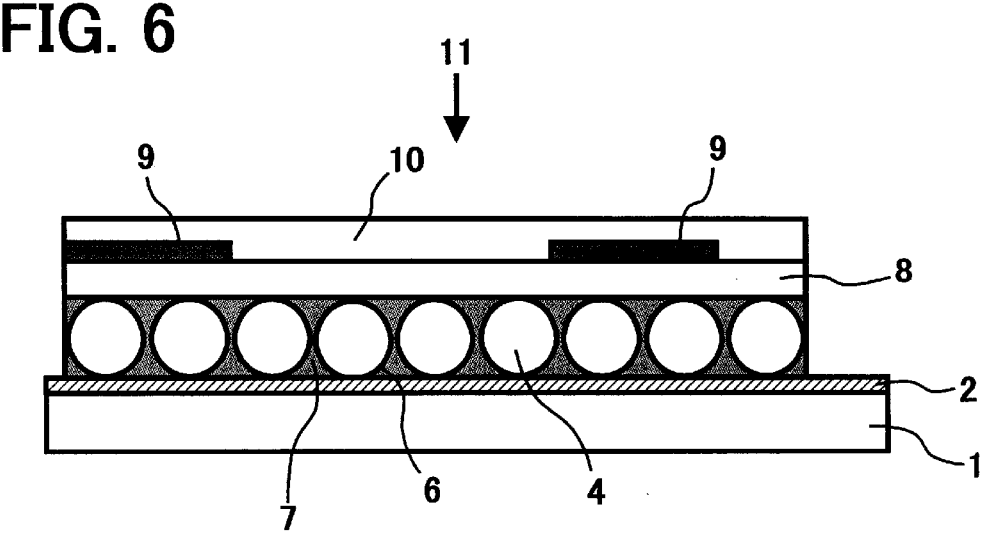

(9) Display Medium as Shown in FIG. 6

On the display medium as shown in FIG. 5, a protective layer 8, is formed. Numeral 11 denotes a display side from which a displayed image can be observed.

(10) Another Display Medium as Shown in FIG. 6

On at least one part of the protective layer 8 of the medium (9), a print layer 9 is formed.

(11) Yet Another Display Medium as Shown in FIG. 6

On the protective layer 8 and print layer 9 of the medium (10), a print-layer protective layer 10 which protects the print layer 9 is formed.

Figure 7A:
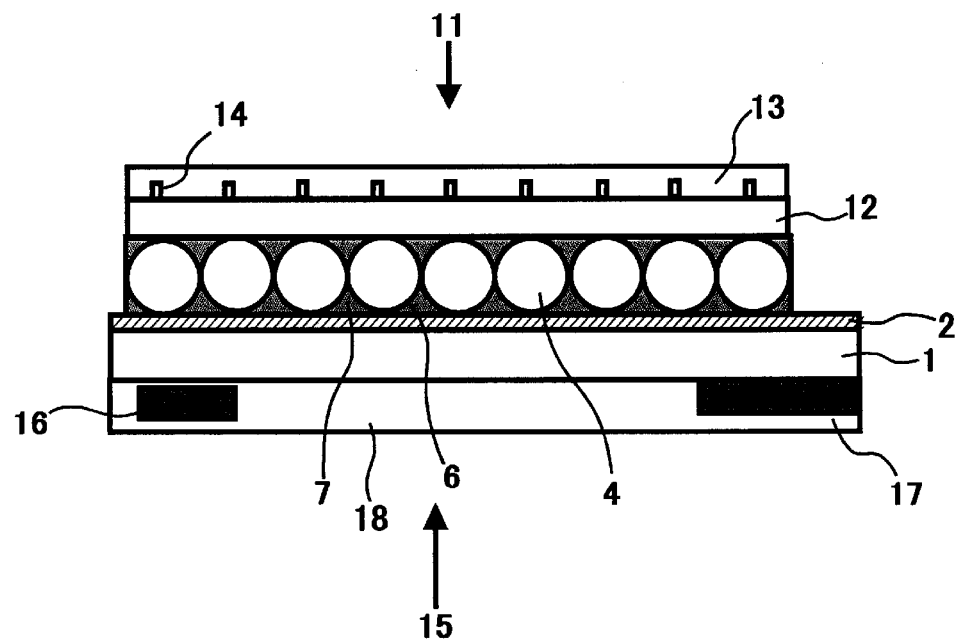
FIGS. 7A and 7B are cross sectional view and plan view of another embodiment of the electrophoretic display medium of the present invention.

(12) Display Medium as Shown in FIG. 7A

On the backside (non-displaying side) of the medium as shown in FIG. 5, an information storage portion, and a protective layer 18 are formed in this order.

(13) Another Display Medium as Shown in FIG. 7A

In the medium (12), the information storage portion includes a magnetic recording material 16 in which information can be written and read out.

(14) Yet Another Display Medium as Shown in FIG. 7A

In the medium (12), the information storage portion includes an IC memory 17 or an optical memory 17.

(15) Further Display Medium as Shown in FIG. 7A

On the image displaying side of the medium as shown in FIG. 5, a first protective layer 12, a transparent optical information recording material 14 in which information can be read out using action of light, and a second protective layer 13 are formed in this order.

(16) Still Further Display Medium as Shown in FIG. 7A

In the medium (15), the information recording material 14 displays information concerning the display/non-display sides (i.e., the front/back sides) and/or position information in the display medium.

In the display medium (3), since the distance between the electrodes 2 is from 20 to 500 times the volume median particle diameter of the white particulate material, the white color thereof can be effectively exhibited, resulting in formation of display images having good visibility. In addition, the electrophoretic mobility of the white particulate material can be improved. When the distance is less than the lower limit, the reflectivity of the white particulate material deteriorates, resulting in formation of image having poor contrast. When the distance is greater than the upper limit, the white particulate material and the colored particulate material must move a long distance to display an image, resulting in deterioration of electrophoretic response of the medium.

In the display medium (6), since the distance between the electrodes 2 is from once to twice the volume median particle diameter of the microencapsulated display liquid, the colors of the white and colored particulate materials can be effectively exhibited, resulting in formation of display images having good visibility. When the distance is greater than twice the display particles, two or more display particles tend to be arranged in the cell (i.e., in the thickness direction of the display medium), resulting in formation of images having poor contrast because the color of the backside of an upper display particle and the color of the display side of a lower display particle mix.

In the display medium (8), since the thickness of the display layer is from once to twice the volume median particle diameter of the microencapsulated display liquid, the colors of the white and colored particulate materials can be effectively exhibited, resulting in formation of display images having good visibility. When the thickness is greater than twice the thickness of the display particles, two or more display particles tend to be arranged in the thickness direction of the display medium, resulting in formation of images having poor contrast because the color of the backside of an upper display particle and the color of the display side of a lower display particle mix.

In the display media as shown in FIGS. 5 to 7, since the display layer includes a binder resin which fills the spaces between the display particles and between the display particles and the electrode, the display particles can be securely fixed to the electrode and to each other, and in addition the visibility of the display media can be improved.

The protective layers formed on the display surface and the backside of the display media protect the substrates, display layer, display cells and/or information storage portions. In addition, a print layer and/or information recording materials can be easily and uniformly formed thereon without damaging the display layer and display cells.

The print layer 9 can be formed by any known print method such as offset printing methods, gravure printing methods, and screen printing methods.

The print-layer protective layer can also be formed on at least a part of the display medium by any known print method such as offset printing methods, gravure printing methods, and screen printing methods.

The information recording portion such as magnetic recording materials, IC memories, optical memories and the like mentioned above can be formed by any known method.

In the transparent optical information recording material, reading of information can only be performed. The recording material is constituted of a near-infrared or ultraviolet fluorescent material. This recording material is not influenced by the electric field applied to the display medium to write or erase image information. Therefore, an information recording medium having a reversible recording portion (i.e., the electrophoretic display medium) and an irreversible recording portion (i.e., the transparent optical recording material) can be provided.

Next, the display device of the present invention will be explained.

The display device includes the display medium of the present invention mentioned above and a writing device having an electric field forming device which can allow the display medium to display visible information. The writing device and the display medium can be attached to each other at least when information is recorded in the display medium. When it is desired that information is recorded in the display medium, the electric field forming device applies an electric field to the display medium according to image signals. The electric field forming device has an electrode array which can change its position relative to the display medium. Namely, the electrode array moves along the surface of the display medium.

Visible images can be displayed in such a display device by applying a ground potential to the common electrode of the medium, and applying a voltage to the predetermined portion of the display medium with the electrode array while scanning the electrode array along the surface of the display medium, wherein the electrode array contacts the surface of the display medium.

The electrode array of the electric field forming device may be substituted with an ion gun array which can supply charges on the surface of the display medium whose common electrode has a ground potential while changing its position relative to the display medium, wherein the ion gun array is set closely to the surface of the display medium. The thus formed charges on the display medium discharge with a time constant depending on the materials constituting the display medium. Therefore, the charging time can be shorter than the moving time (i.e., the response time) of the colored and white particulate materials. Namely, when the discharging time of the charge formed on the display medium is longer than the moving time of the particulate materials, the white and colored particulate materials move toward an electrode of the display medium even if the charging is stopped. Therefore, the image writing time can be shortened and high speed image recording is possible.

In the display device, visible images may be recorded in the display medium using a plurality of signal electrodes, a plurality of scanning electrodes, and switching elements which are provided at the intersections of the signal electrodes and the scanning electrodes. Namely, the switching elements apply electric fields to the display medium according to image information. Thus, visible images can be displayed in the display medium. The thus formed charges on the display medium discharge with the time constant depending on the materials constituting the display medium. Therefore, the charging time can be shorter than the moving time (i.e., the response time) of the particulate materials. Namely, when the discharging time of the charge formed on the display medium is longer than the moving time of the white and colored particulate materials, the particulate materials move toward an electrode of the display device even if the charging is stopped. Therefore, the image writing time can be shortened and high speed recording is possible.

The switching elements are preferably thin film transistors because a thin film device having a large area can be easily manufactured. Thin film transistors are three terminal elements, and therefore have good switching properties. Accordingly, images including halftone images can be clearly displayed. In order to increase the writing speed, storage-type condensers may be provided as an equivalent circuit in parallel with the display medium.

The display medium of the present invention finds wide applications. For example, the display medium can be used for a small card such as name cards, credit cards, point cards and member cards. By preparing a card in which the display medium is provided on the entire part or a part of the surface of the card, image information can be rewritten. In addition, by preparing the display medium having a large size, the display medium can be used as reversible image displaying media capable of substituting for the displays and recording sheets (e.g., copy paper), which are used in offices and the like. These reversible image displaying media are superior because they can be repeatedly used, resulting in material saving and energy saving.

In addition, the display medium can be used as a display device of home electric products and the like. The display medium of the present invention has advantages over liquid crystal devices, which are typically used as a display medium of home electric products. For example, the display medium has a relatively wide angle of visual field. In addition, the display medium can display images having a relatively high image density compared to liquid crystal devices.

The display medium can be used as signboards and the like. Furthermore, the display medium can be used as a part of posters.

Since it is possible to impart a flexibility to the display medium of the present invention by using plastic films and the like as the substrates, the display medium can be used for the various applications mentioned above.

Then the electrophoretic display medium of the present invention will be explained in detail referring to FIG. 1.

The substrate 1 is typically constituted of a glass or plastic plate. The thickness of the substrate 1 is preferably from about 10 $\mu$m to about 1 mm, and more preferably from about 25 $\mu$m to about 200 $\mu$m. The substrate of the image displaying side is transparent. The substrate of the backside may be transparent, opaque or colored. The color of the backside substrate can be utilized for image displaying. When an opaque substrate is used as the backside substrate, the contrast of displayed images can be enhanced.

The electrode 2 is an electroconductive thin film made of a metal, an indium tin oxide (ITO), SnO2, ZnO:Al and the like material. The electrode can be formed by a method such as sputtering methods, vacuum deposition methods, chemical vapor deposition (CVD) methods and coating methods. When the electrode 2 is formed on the transparent substrate on which images are to be formed, the electrode 2 is needed to be transparent. In this case, the electrode 2 is made of a transparent material such as ITO, $SnO_2$, ZnO:Al and the like material.

The electrode 2 on the backside substrate may be colored. In addition, the color of the electrode can be utilized for image displaying. At least one of the electrodes 2 is an electrode having a matrix pattern.

The spacers 3 form one or more cells such that the distance between the opposing electrodes (i.e., the spacing of the cells) is from 20 to 500 times the volume median particle diameter of the white particulate material included in the display liquid, which is contained in the cells.

Another embodiment of the display material will be explained referring to FIG. 2.

The electrode 2 is formed on the entire surface of the substrate 1. The insulating film 5 has a thickness of from 5 to 500 $\mu$m. When displayed images are observed from the insulating film side, the film needs to be transparent. When displayed images are observed from the substrate side, the substrate 1 and the electrode 2 need to be transparent, and the insulating film may be opaque or colored. In this case, the color of the insulating film can be utilized for image displaying. The functions of the spacers 3 are mentioned above.

Yet another embodiment of the display material of the present invention will be explained referring to FIG. 3.

The substrate 1, electrode 2 and spacers 3 are the same of those of the display device as shown in FIG. 1. The microencapsulated display liquid 6 can be prepared using one or more of the materials mentioned by any one of the methods mentioned above. The microencapsulated display liquid 6 are contained as a powder. As mentioned above, the distance between the opposing electrodes is controlled by the spacers 3 so as to be preferably from once to twice the volume median particle diameter of the display liquid 6.

In addition, in order to effectively apply the electric field to the microencapsulated display liquid 6, the display liquid 6 may be contained in the cells while being dispersed in a dielectric constant controlling agent such as alcohols, ketones and carboxylic acid salts. Further, as explained referring to FIG. 5, the display liquid 6 may be dispersed in a binder resin.

A further embodiment of the display device of the present invention will be explained referring to FIG. 4.

The substrate 1, electrode 2, spacers 3, insulating film 5 and display liquid 4 are the same of those of the display device as shown in FIG. 2. The microencapsulated display liquid 6 can be prepared in the same way as that mentioned above. The spacers 3 form a cell such that the distance between the opposing electrodes is from 1 to 2 times the volume median particle diameter of the microencapsulated display liquid 6. The display liquid 6 can be contained in the same way as that mentioned above.

A still further embodiment of the display device of the present invention will be explained referring to FIG. 5.

The substrate 1, display liquid 4 and display particles 6 are the same as those of the display devices as shown in FIGS. 3 and 4. The electrode 2 is a common electrode which is or is not patterned like a matrix. The display layer is constituted of the microencapsulated display liquid 6 and a binder resin 7. The display layer can be formed by, for example, the following method:

(1) the display liquid 6 are dispersed in a solution, dispersion, suspension or emulsion of a binder resin to prepare a coating liquid;

(2) the coating liquid is coated on the electrode 2 by a coating method such as wire tear coating, roll coating, blade coating, dip coating, spray coating, spin coating, gravure coating and the like; and (3) the coated liquid is dried to form a display layer.

Specific examples of the binder resin include the materials mentioned above for use as the shell of the microcapsule display particles, and polyethylene, polypropylene, polystyrene, polyvinyl chloride, polyvinylidene chloride, vinyl chloride-vinyl acetate copolymers, polyvinyl butyral, polyvinyl alcohol, polyethylene oxide, polypropylene oxide, ethylene-vinyl alcohol copolymers, polyacetal, methyl cellulose, ethyl cellulose, phenolic resins, fluorine-containing resins, silicone resins, diene resins, polystyrene type thermoplastic elastomers, polyester type thermoplastic elastomers, polyphenylene ether, polyphenylene sulfide, polyether sulfone, polyether ketone, polyarylate, aramid, polyimide, poly-p-phenylene, poly-p-xylene, poly-p-phenylene vinylene, polyhyndantoin, polyparabanic acid, polybenzimidazole, polybenzothiazole, polybenzoxiadiazole, polyquinoxaline, and the like resins are exemplified. These materials can be used alone or in combination. In order to effective apply the electric field to the display liquid 6, the binder resin 7 preferably has a dielectric constant not lower than that of the display liquid. In order to control the dielectric constant of the binder resin 7, a dielectric constant controlling agent such as alcohol, ketone and carboxylic acid salts can be added to the binder resin 7.

A still further embodiment of the display device of the present invention will be explained referring to FIG. 6

The substrate 1, electrode 2, display liquid 4, display layer and binder resin 7 are explained above.

The protective layer 8 is formed by, for example, the following methods:

(1) a material for the protective layer is dissolved, dispersed, suspended, or emulsified in a solvent, optionally together with a hardener, catalyst, and/or assistant catalyst, to form a coating liquid, and the coating liquid is coated on the display layer by any one of the coating methods mentioned above; or (2) the protective layer material is coated on the display layer by a method such as sputtering methods, chemical vapor deposition methods or the like methods.

Specific examples of the protective layer material include the materials mentioned above for use as the binder resin, and phenolic resins, urea resins, melamine resins, alkyd resins, acrylic resins, unsaturated polyester resins, diarylphthalate resins, epoxy resins, silicone resins, faran resins, ketone resins, xylene resins, thermosetting polyimide resins, styrylpyridine, cyanate type thermosetting resins and the like; ultraviolet crosslinking monomers such as 2-hydroxyethylacrylate, 2-hydroxypropylacrylate, 2-ethylhexyl acrylate, e-hydroxyethyl acryloylphosphate, 1,3-butadiol diacrylate, 1,4-butadiol diacrylate, 1,6-hexanediol diacrylate, diethylene glycol diacrylate, tripropylene glycol diacrylate, neopentyl glycol diacrylate, polyethylene glycol diacrylate, neopentyl glycol diacrylate of hydroxypivalic acid ester, dipentaerythritol, pentaerythritol triacrylate, trimethylolpropane triacrylate, and the like; and ultraviolet crosslinking oligomers such as polyester acrylate, epoxy acrylate, polyurethane acrylate, polyether acrylate, silicone acrylate, alkyd acrylate, melamine acrylate and the like are exemplified.

The print layer 9 can be formed overlying any part of the display medium except on the display area using any known printing method. The print layer 9 preferably formed on a protective layer 8. The print layer can be formed overlying the entire surface of a backside substrate. The thickness of the protective layer 8 is preferably as thin as possible to protect the microencapsulated display liquid, and is from 0.1 to 100 $\mu$m, and more preferably from 0.3 to 30 $\mu$m.

The print-layer protective layer 10 is made of one or more materials mentioned above for use in the protective layer 8. The print-layer protective layer 10 can be formed on the print layers and the protective layer 8 by one of the methods mentioned above for use in coating of the print layer 9.

A still further embodiment of the display device of the present invention will be explained referring to FIGS. 7A and 7B.

The substrate 1, electrode 2, electrophoretic display liquid 4, microencapsulated display liquid 6 and binder resin 7 are explained above. As shown in FIG. 7A, the first protective layer 12 which is made of one or more of the materials mentioned above for use in the protective layer 7 is formed on the display layer. On the first protective layer 12, the transparent optical information recording material 14 is formed. The second protective layer 13 is formed on the first protective layer 12 and the recording portion 14, resulting in formation of the display area. On the backside, the magnetic recording material 16 and IC memory 17 are formed on at least a part of the substrate 1, and a third protective layer 18 is formed thereon.

Figure 7B:
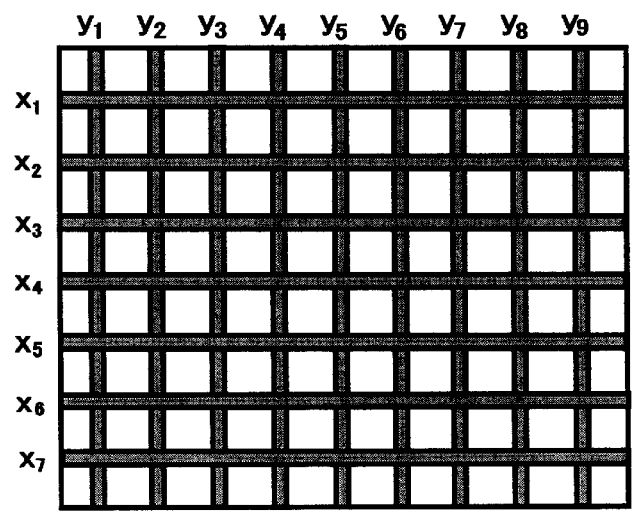

As shown in FIG. 7B, the transparent recording material 14 may be formed like a lattice. The intersections (xn, ym) of the horizontal lines (xn) and vertical lines (ym) can be used as information concerning the position in the medium to be only read out. Thus, digital information can be obtained.

Next, the electrophoretic display device and method will be explained referring to FIG. 8.

Figure 8:
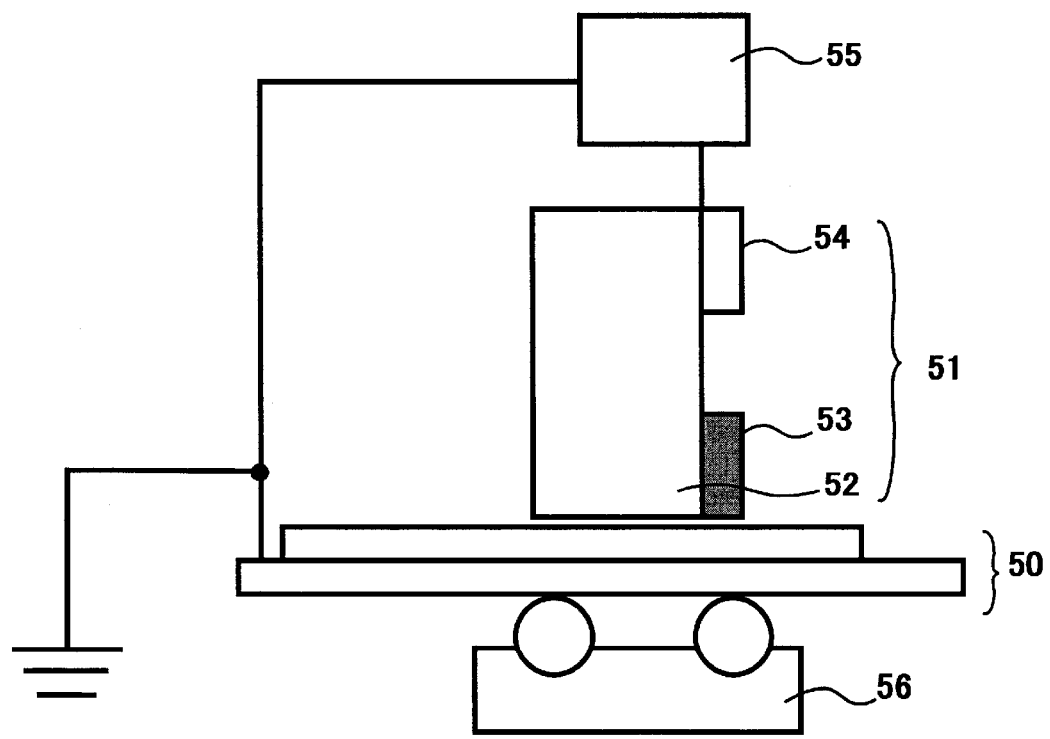
FIGS. 8 and 9 are schematic views illustrating the cross sections of the writing device of the electrophoretic display device of the present invention

In FIG. 8, the displaying device includes an electrode array 51 serving as an electric field forming device, a circuit board 52 for writing, an electrode bar 53, a switching circuit 54, a power source 55, and a feeding mechanism 56. For example, the electrode array 51 includes 1600 electrode bars which are arranged at equal intervals of 125 $\mu$m. Images can be displayed by applying voltage pulses to the electrode bars 53 via the switching circuit 54 according to image signals while feeding the display medium 50 in the horizontal direction using the roller feeding mechanism 56.

Another display device of the present invention will be explained referring to FIG. 9.

Figure 9:
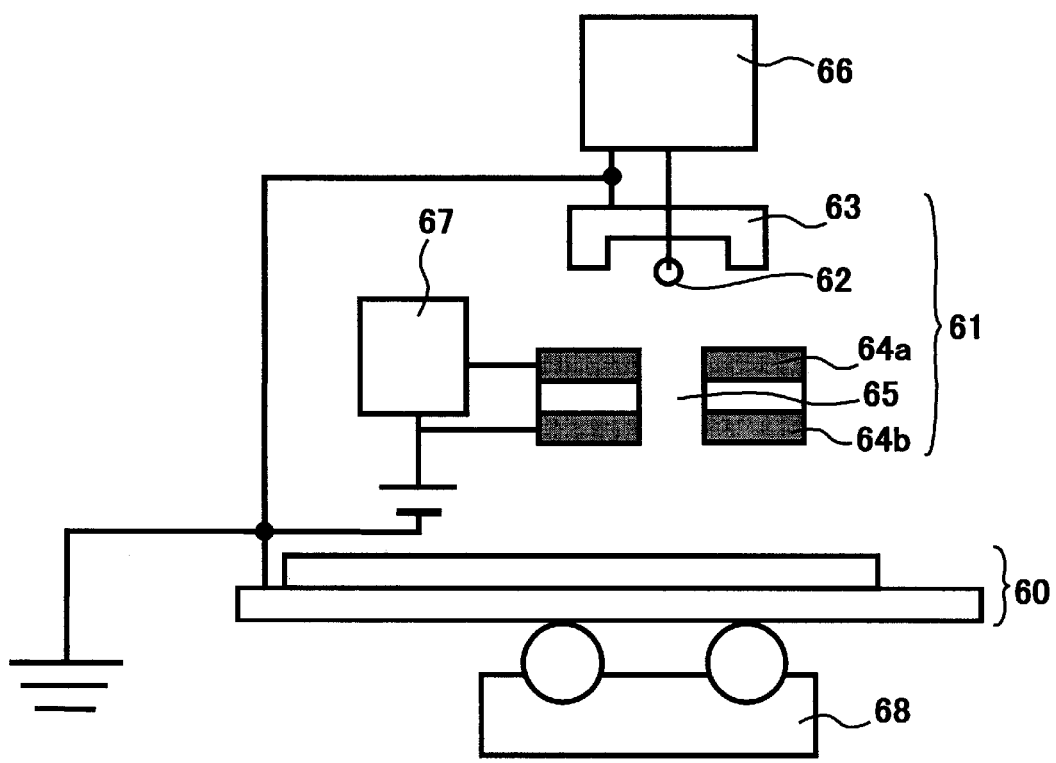

In FIG. 9, the display device includes an ion gun array 61 serving as an electric field forming device, a corona wire 62, a discharge flame 63, control electrodes 64a and 64b, an aperture 65, a high voltage power source 66 for generating corona ions, a second power source 67 for controlling ion flow, and a feeding mechanism 68. For example, the ion gun array 61 includes 1600 ion guns which are arranged at equal intervals of 125 $\mu$m.

It is supposed that black and white images are formed. Images can be formed by applying a negative (or positive) voltage to the corona wire 62 to make the entire display medium white (or black). When the display medium is white, a positive (or negative) voltage is applied to the corona wire 62 while applying a positive voltage (when a black image area is formed) or a negative voltage (when a white image area is formed) according to the image signals. In this case, the voltage applying operation is performed while feeding the display medium 50 using the roller feeding mechanism 68.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Method for Preparation of White Particulate Material a Having Hollow therein

One hundred grams of a porous silica having hollows therein (tradenamed as B-6C and manufactured by SUZUKI YUSHI INDUSTRIAL CO., LTD.) were contained in a screw feeder of Coatmizer MINI (manufactured by Freund Corp.). About 100 g of an emulsion of a polymer having a repeating unit including a fluoroalkyl group (tradenamed as Unidine TG-521 and manufactured by Daikin Industries, Ltd.) were contained in a coating liquid tank. The porous silica, which was aggregated, was pulverized while applying shear stress in the screw feeder to prepare primary particles of the silica. The silica was then fed to a jet feeder to be discharged to a dispersion tank in an amount of about 1.8 g/min using jet air. On the other hand, the emulsion in the coating liquid tank was sprayed to the dispersion tank in an amount of 1.5 g/min from a special nozzle using a constant flow pump. The silica and emulsion, which collided with each other in the dispersion tank, were then fed to a drying tank, which was heated to about 80° C. and which was connected with the dispersion tank, to dry the mixture. Then the dried complex particles were collected in a cyclone. The complex particles were taken out of the cyclone, and then dried at 60° C. for 24 hours under a reduced pressure. Then the complex particles were subjected to a heat treatment at 160° C. for 3 minutes, and classified. Thus, a white particulate material (white particulate material A) having hollows therein was prepared.

Example 1
Preparation of Electrophoretic Display Liquid

Five (5) grams of oleic acid were dissolved in 100 ml of dodecyl benzene. Then 1.0 g of surface-treated titanium black (tradenamed as superfine particle type Tilack D and manufactured by Ako Kasei Co., Ltd.) was added into the solution, and the mixture was supersonically dispersed for about 15 minutes. Then the mixture was further dispersed for about 30 hours using a bead mill including zirconia beads to prepare a dispersion of the black particulate material.

Further, 10.0 g of a white particulate material, a crosslinked styrene-acrylate copolymer having hollows therein (tradenamed as SX-866A and manufactured by Japan Synthetic Rubber Co., Ltd.),were added to the dispersion, and the mixture was dispersed for about 30 minutes. Thus, an electrophoretic display liquid was prepared.

The white particulate material dispersed in the display liquid had a volume median particle diameter of about 8 $\mu$m. The ratio of the volume median particle diameter of the titanium black to that of the white particulate material was about 1/27.

Preparation of Electrophoretic Display Medium

A transparent electroconductive layer (ITO layer) was formed by a sputtering method on one side of each of two transparent glass plates having a thickness of 3 mm. The glass plates were opposed with nylon spacers therebetween to form a cell such that the electroconductive layers faced each other and the distance between the plates (i.e., the spacing of the cell) was about 140 $\mu$m.

The display liquid prepared above was contained in the cell using a syringe, and then the glass plates were sealed with an epoxy adhesive. Thus an electrophoretic display medium was prepared.

The spacing of the cell was about 18 (140/8) times the volume median particle diameter of the white particulate material.

Example 2
Preparation of Electrophoretic Display Liquid

Five (5) grams of oleic acid were dissolved in 100 ml of dodecyl benzene. Then 1.0 g of tri-iron tetroxide (i.e., magnetite, manufactured by Wako Pure Chemical Industries, Ltd.) was added into the solution, and the mixture was supersonically dispersed for about 15 minutes.

Further, 10.0 g of a white particulate material A were added to the dispersion, and the mixture was dispersed for about 4 hours using a bead mill including zirconia beads. Thus, an electrophoretic display liquid was prepared.

The white particulate material A dispersed in the display liquid had a volume median particle diameter of about 2.2 $\mu$m. The ratio of the volume median particle diameter of the tri-iron tetroxide to that of the white particulate material A was about 1/22.

Preparation of Electrophoretic Display Medium

The procedure for preparation of the display medium in Example 1 was repeated except that the spacing of the cell was changed to about 210 $\mu$m and the display liquid was changed to the display liquid prepared above.

The spacing of the cell was about 95 times the volume median particle diameter of the white particulate material A.

Example 3
Preparation of Electrophoretic Display Liquid

Five (5) grams of oleic acid were dissolved in 100 ml of dodecyl benzene. Then 1.0 g of surface-treated titanium black (tradenamed as superfine particle type Tilack D and manufactured by Ako Kasei Co., Ltd.) was added into the solution, and the mixture was supersonically dispersed for about 15 minutes.

Further, 10.0 g of a white particulate material A were added to the dispersion, and the mixture was dispersed for about 20 hours using a bead mill. Thus, an electrophoretic display liquid was prepared.

The white particulate materials dispersed in the display liquid had a volume median particle diameter of about 1.8 $\mu$m. The ratio of the volume median particle diameter of the titanium black to that of the white particulate material A was about 1/6.

Preparation of Electrophoretic Display Medium

The procedure for preparation of the display medium in Example 1 was repeated except that the spacing of the cell was changed to about 210 $\mu$m and the display liquid was changed to the display liquid prepared above.

The spacing of the cell was about 117 times the volume median particle diameter of the white particulate material A.

Example 4
Preparation of Electrophoretic Display Liquid

Five (5) grams of Adekacol WS-100 manufactured by Asahi Denka Kogyo were dissolved in 100 ml of a dispersion medium, ditoluyl ethylene (tradenamed as SAS-296 and manufactured by Nippon Oil Co., Ltd.) Then 1.0 g of surface-treated titanium black (tradenamed as Tilack D and manufactured by Ako Kasei Co., Ltd.) was added into the solution, and the mixture was supersonically dispersed for about 15 minutes.

Further, 10.0 g of a white particulate material, a crosslinked styrene-acrylate copolymer having hollows therein (tradenamed as SX-866A and manufactured by Japan Synthetic Rubber Co., Ltd.), were added to the dispersion, and the mixture was dispersed for about 30 hours using zirconia beads. Thus, an electrophoretic display liquid was prepared.

The white particulate material dispersed in the display liquid had a volume median particle diameter of about 0.3 $\mu$m. The ratio of the volume median particle diameter of the titanium black to that of the white particulate material was about 1/1.

Preparation of Electrophoretic Display Medium

The procedure for preparation of the display medium in Example 1 was repeated except that the display liquid was changed to the display liquid prepared above.

The spacing of the cell was about 467 times the volume median particle diameter of the white particulate material.

Example 5
Preparation of Electrophoretic Display Liquid

Five (5) grams of a hydroxy fatty acid oligomer, Adekacol WS-100 manufactured by Asahi Denka Kogyo, were dissolved in 100 ml of a dispersion medium, ditoluyl ethylene (tradenamed as SAS-296 and manufactured by Nippon Oil Co., Ltd.) Then 1.0 g of surface-treated titanium black (tradenamed as super fine type Tilack D and manufactured by Ako Kasei Co., Ltd.) was added into the solution, and the mixture was supersonically dispersed for about 15 minutes.

Further, 10.0 g of a white particulate material, a crosslinked styrene-acrylate copolymer having hollows therein (tradenamed as SX-866A and manufactured by Japan Synthetic Rubber Co., Ltd., whose primary particle diameter was 0.3 $\mu$m and which was prepared by a spray drying method), were added to the dispersion, and the mixture was dispersed for about 30 hours using a bead mill including zirconia beads. Thus, an electrophoretic display liquid was prepared.

The white particulate material dispersed in the display liquid had a volume median particle diameter of about 0.3 $\mu$m. The ratio of the volume median particle diameter of the titanium black to that of the white particulate material was about 1/10.

Preparation of Electrophoretic Display Medium

The procedure for preparation of the display medium in Example 1 was repeated except that the display liquid was changed to the display liquid prepared above.

The spacing of the cell was about 467 times the volume median particle diameter of the white particulate material.

Example 6
Preparation of Electrophoretic Display Medium

A transparent electroconductive layer (ITO layer) was formed on one side of a transparent glass plate having a thickness of 3 mm by a sputtering method. The glass plate and a polyacrylate film (tradenamed as EMBLET manufactured by Unitika Ltd.) serving as an insulating film were opposed with nylon spacers therebetween to form a cell such that the spacing of the cell was about 140 $\mu$m.

The display liquid prepared in Example 5 was contained in the cell using a syringe, and then the glass plate and polyacrylate film were sealed with an epoxy adhesive. Thus an electrophoretic display medium was prepared.

The spacing of the cell was about 467 times the volume median particle diameter of the white particulate material.

Example 7

The procedure for preparation of the display medium in Example 6 was repeated except that the spacing of the cell was changed to 155 $\mu$m.

Thus an electrophoretic display medium was prepared in which the spacing of the cell was about 517 times the volume median particle diameter of the white particulate material.

Comparative Example 1
Preparation of Electrophoretic Display Liquid

Five (5) grams of Adekacol WS-100 manufactured by Asahi Denka Kogyo were dissolved in 100 ml of a dispersion medium, dodecyl benzene. Then 10.0 g of a white particulate material, a crosslinked styrene-acrylate copolymer having hollows therein (tradenamed as SX-866A and manufactured by Japan Synthetic Rubber Co., Ltd.), were added to the solution, and the mixture was dispersed for about 30 hours using a bead mill including zirconia beads. Then 1.0 g of surface-treated titanium black (tradenamed as superfine type Tilack D and manufactured by Ako Kasei Co., Ltd.) was added into the dispersion, and the mixture was agitated for about 30 minutes. Thus, an electrophoretic display liquid was prepared.

The white particulate material dispersed in the display liquid had a volume median particle diameter of about 0.3 $\mu$m. The ratio of the volume median particle diameter of the titanium black to that of the white particulate material was about 1/0.33.

Preparation of Electrophoretic Display Medium

The procedure for preparation of the display medium in Example 1 was repeated to prepare a display medium.

The spacing of the cell was about 467 times the volume median particle diameter of the white particulate material.

Comparative Example 2
Preparation of Electrophoretic Display Medium

The procedure for preparation of the display medium in Example 1 was repeated except that the spacing of the cell was changed to about 280 $\mu$m and the display liquid was changed to the display liquid prepared in Example 4.

Thus, an electrophoretic display medium was prepared in which the spacing of the cell was about 933 times the volume median particle diameter of the white particulate material.

Example 8
Preparation of Microencapsulated Display Liquid

An aqueous solution of gelatin and an aqueous solution of gum arabic were mixed, and the mixture was heated to 50° C. An aqueous solution of sodium hydroxide was added thereto to control the PH of the mixture so as to be 9. The display liquid prepared in Example 1 was added to the mixture and agitated to emulsify the display liquid. Then the pH of the mixture was decreased so as to be 4 to deposit concentrated gelatin/gum arabic at the interface between the dispersed display liquid and the gelatin/gum arable solution. The temperature of the mixture was then decreased to form a gel film of gelatin. The gel film was hardened by adding an aqueous solution of glutaric aldehyde. Thus, a slurry of microencapsulated display liquid having a gelatin shell was prepared. At this point, the emulsifying conditions were controlled such that the microencapsulated display liquid had a volume median particle diameter of about 55 μm. The ratio of the volume median particle diameter of the white particulate material to that of the microencapsulated display liquid was 7.

Preparation of Display Medium

Twenty (20) grams of the microencapsulated display liquid prepared above were added to 80 g of a 10% aqueous solution of polyvinyl alcohol to prepare a dispersion. The dispersion was coated on an ITO layer formed on a polycarbonate substrate using an applicator having a gap of about 1 mm. The coated dispersion was then dried to form a display layer in which the ratio of the volume median particle diameter (about 55 μm) of the as microencapsulated display liquid to the thickness (about 100 μm) of the display layer was 1/1.8.

The display layer was fixed with a tape so as to be contacted with an ITO electrode formed on a glass substrate. Thus, an electrophoretic display medium was prepared.

Example 9
Preparation of Microencapsulated Display Liquid

The procedure for preparation of the microencapsulated display liquid in Example 8 was repeated except that the display liquid was changed to the display liquid prepared in Example 2. The ratio of the volume median particle diameter (about 2.2 μm) of the white particulate material A to that (about 125 μm) of the microencapsulated display liquid was 1/57.

Preparation of Display Medium

The procedure for preparation of the display medium in Example 8 was repeated except that the microencapsulated display liquid prepared above was used.

The thickness of the display layer was about 200 μm, and the ratio of the volume median particle diameter (about 125 μm) of the microencapsulated display liquid to the thickness (about 200 μm) of the display layer was 1/1.6.

Example 10
Preparation of Microencapsulated Display Liquid

The procedure for preparation of the microencapsulated display liquid in Example 8 was repeated except that the display liquid was changed to the display liquid prepared in Example 3. The ratio of the volume median particle diameter (about 1.8 μm) of the white particulate material A to that (about 125 μm) of the microencapsulated display liquid was 1/69.

Preparation of Display Medium

The procedure for preparation of the display medium in Example 8 was repeated except that the microencapsulated display liquid prepared above was used.

The thickness of the display layer was about 200 μm, and the ratio of the volume median particle diameter (about 125 μm) of the microencapsulated display liquid to the thickness (about 200 μm) of the display layer was 1/1.6.

Example 11
Preparation of Microencapsulated Display Liquid

The procedure for preparation of the microencapsulated display liquid in Example 8 was repeated except that the display liquid was changed to the display liquid prepared in Example 4. The ratio of the volume median particle diameter (about 0.3 μm) of the white particulate material A to that (about 125 μm) of the microcapsule display particles was 1/417.

Preparation of Display Medium

The procedure for preparation of the display medium in Example 8 was repeated except that the microencapsulated display liquid prepared above was used.

The thickness of the display layer was about 200 μm, and the ratio of the volume median particle diameter (about 125 μm) of the microencapsulated display liquid to the thickness (about 200 μm) of the display layer was 1/1.6.

Example 12
Preparation of Microencapsulated Display Liquid

The procedure for preparation of the microencapsulated display liquid in Example 8 was repeated except that the display liquid was changed to the display liquid prepared in Example 5. The ratio of the volume median particle diameter (about 0.3 μm) of the white particulate material A to that (about 55 μm) of the microencapsulated display liquid was 1/183.

Preparation of Display Medium

The procedure for preparation of the display medium in Example 8 was repeated except that the microencapsulated display liquid prepared above was used.

The thickness of the display layer was about 100 μm, and the ratio of the volume median particle diameter (about 55 μm) of the microencapsulated display liquid to the thickness (about 100 μm) of the display layer was 1/1.8.

Comparative Example 3
Preparation of Microencapsulated Display Liquid

The procedure for preparation of the microencapsulated display liquid in example 8 was repeated except that the display liquid was changed to the display liquid prepared in Comparative Example 2. The ratio of the volume median particle diameter (about 0.3 μm) of the white particulate material A to that (about 55 μm) of the microencapsulated display liquid was 1/183.

Preparation of Display Medium

The procedure for preparation of the display medium in Example 8 was repeated except that the microencapsulated display liquid prepared above was used.

The thickness of the display layer was about 100 μm, and the ratio of the volume median particle diameter (about 55 μm) of the microencapsulated display liquid to the thickness (about 100 μm) of the display layer was 1/1.8.

Comparative Example 4
Preparation of Microencapsulated Display Liquid

The procedure for preparation of the microencapsulated display liquid in Example 8 was repeated except that the display liquid was changed to the display liquid prepared in Example 4. The ratio of the volume median particle diameter (about 0.3 μm) of the white particulate material to that (about 250 μm) of the microencapsulated display liquid was 1/833.

Preparation of Display Medium

The procedure for preparation of the display medium in Example 8 was repeated except that the microencapsulated display liquid prepared above was used.

The thickness of the display layer was about 400 μm, and the ratio of the volume median particle diameter (about 250 μm) of the microencapsulated display liquid to the thickness (about 400 μm) of the display layer was 1/1.6.

Comparative Example 5
Preparation of Microencapsulated Display Liquid

The procedure for preparation of the microencapsulated display liquid in Example 10 was repeated. The ratio of the volume median particle diameter (about 0.3 μm) of the white particulate material to that (about 55 μm) of the microencapsulated display liquid was 1/183.

Preparation of Display Medium

The procedure for preparation of the display medium in Example 10 was repeated except that the thickness of the display layer was 100 μm. This coating was performed one more time to form a double-layered display layer having a total thickness of about 200 μm.

The thickness of the display layer was 200 μm, and the ratio of the volume median particle diameter (about 55 μm) of the microencapsulated display liquid to the thickness (about 200 μm) of the display layer was 1/3.6.

Evaluation of Electrophoretic Properties

The electrophoretic properties of the thus prepared display media of Examples 1 to 12 and Comparative Examples 1 to 5 were evaluated as follows:

a voltage of +500 v or −500 v was applied to a display medium for 10 second to make the display medium perform electrophrese. The reflectivity of the display surface was measured using an instrument, Photal MCPD-1000 manufactured by Otsuka Electronics Co., Ltd. In this case, the light having a wavelength range of from 380 to 800 nm irradiated the display surface at an angle of 45° and the reflected light was received at an angle of 45° to measure the reflectivity. In addition, a contrast C of an image was calculated as follows:

C=Rw/Eb wherein Rw represents the reflectivity of the display surface when the display color is white, and Rb represents the reflectivity of the display surface when the display color is black.

The results are shown in Table 1.

TABLE 1

|  | Dc/Dw | D/Dw | Dw (μm) | D/Dm | Rw (%) | Rb (%) | Contrast (C) |
|---|---|---|---|---|---|---|---|
| Ex. 1 | 1/27 | 18 | 8 | — | 16.0 | 2.1 | 7.6 |
| Ex. 2 | 1/22 | 95 | 2.2 | — | 24.0 | 4.0 | 6.0 |
| Ex. 3 | 1/6 | 117 | 1.8 | — | 24.0 | 2.8 | 8.6 |
| Ex. 4 | 1/1 | 467 | 0.3 | — | 36.0 | 2.7 | 13.3 |
| Ex. 5 | 1/10 | 467 | 0.3 | — | 37.0 | 2.1 | 17.6 |
| Ex. 6 | 1/10 | 467 | 0.3 | — | 37.0 | 2.2 | 16.8 |
| Ex. 7 | 1/10 | 517 | 0.3 | — | 37.0 | 2.6 | 14.2 |
| Comp. Ex. 1 | 1/0.33 | 467 | 0.3 | — | 18.0 | 8.0 | 2.3 |
| Comp. Ex. 2 | 1/1 | 933 | 0.3 | — | 24.0 | 6.0 | 4.0 |

TABLE 1-continued

|  | Dc/Dw | D/Dw | Dw (μm) | D/Dm | Rw (%) | Rb (%) | Contrast (C) |
|---|---|---|---|---|---|---|---|
| Ex. 8 | 1/27 | 7 | 8 | 1.8 | 15.0 | 2.3 | 6.5 |
| Ex. 9 | 1/22 | 57 | 2.2 | 1.6 | 23.0 | 4.3 | 5.3 |
| Ex. 10 | 1/6 | 69 | 1.8 | 1.6 | 23.0 | 3.4 | 6.8 |
| Ex. 11 | 1/1 | 417 | 0.3 | 1.6 | 35.0 | 2.9 | 12.1 |
| Ex. 12 | 1/10 | 183 | 0.3 | 1.8 | 32.0 | 2.8 | 11.4 |
| Comp. Ex. 3 | 1/0.33 | 183 | 0.3 | 1.8 | 17.0 | 9.0 | 1.9 |
| Comp. Ex. 4 | 1/10 | 833 | 0.3 | 1.6 | 12.0 | 8.0 | 1.5 |
| Comp. Ex. 5 | 1/10 | 183 | 0.3 | 3.6 | 15.0 | 6.0 | 2.5 |

Dc: volume median particle diameter of the color (black) particulate material
Dw: volume median particle diameter of the white particulate material
D: spacing of the cell
Dm: volume median particle diameter of the microencapsulated display liquid
Rw: reflectivity of the display surface when the image is white Rb: reflectivity of the display surface when the image is black As can be understood from Table 2, the electrophoretic display media of the present invention can produce images having relatively high contrast compared to the images produced by the comparative display media.

Comparative Example 6
Preparation of Electrophoretic Display Liquid

Ten (10) grams of a surfactant, Adekacol WS-100 manufactured by Asahi Denka Kogyo, were dissolved in 100 ml of a dispersion medium, ditoluyl ethylene (tradenamed as SAS-296 and manufactured by Nippon Oil Co., Ltd.). Then 10.0 g of a white particulate material, a crosslinked styrene-acrylate copolymer having hollows therein (tradenamed as SX-866A and manufactured by Japan Synthetic Rubber Co., Ltd.,whose primary particle diameter was 0.3 μm), were added to the solution, and the mixture was dispersed for about 30 hours using a bead mill including zirconia beads.

Then 2.0 g of surface-treated titanium black (tradenamed as superfine type Tilack D and manufactured by Ako Kasei Co., Ltd.) were added into the dispersion, and the mixture was further dispersed for 1 hour by the bead mill. Thus, an electrophoretic display liquid was prepared.

The white particulate material dispersed in the display liquid had a volume median particle diameter of about 0.3 μm. The ratio of the volume median particle diameter of the titanium black to that of the white particulate material was about 1/0.9.

Preparation of Electrophoretic Display Medium

The procedure for preparation of the display medium in Example 1 was repeated. Thus, an electrophoretic display medium in which the ratio of the volume median particle diameter to the spacing of the cell was 1/467 was prepared.

Comparative Example 7

The procedure for preparation of the display medium in Example 1 was repeated except that the spacing of the cell was 155 μm, and the display liquid was replaced with that prepared in Comparative Example 6. Thus, an electrophoretic display medium in which the ratio of the volume median particle diameter to the spacing of the cell was 1/517 was prepared.

Evaluation of Electrophoretic Properties

Each of the display media prepared in Example 4 and Comparative Examples 6 and 7 was evaluated in the same way as performed above except that the applied voltage was changed to the following levels:

±300v, and ±500v.

The results are shown in Table 2.

TABLE 2

|  | | | Applied Voltage of ±300 v | | | Applied Voltage of ±500 v | | |
|---|---|---|---|---|---|---|---|---|
|  | Dc/Dw | D/Dw | Dw (μm) | Rw (%) | Rb (%) | Contrast | Rw (%) | Rb (%) | Contrast |
| Ex. 4 | 1/1 | 467 | 0.3 | 36.0 | 3.0 | 12.0 | 36.0 | 2.7 | 13.6 |
| Comp. Ex. 6 | 1/0.9 | 467 | 0.3 | 35.5 | 5.0 | 7.1 | 36.0 | 2.6 | 13.6 |
| Comp. Ex. 7 | 1/0.9 | 517 | 0.3 | 34.0 | 6.0 | 5.7 | 36.0 | 2.6 | 13.6 |

As can be understood from Table 2, the display media of Comparative Examples 6 and 7 have a contrast as high as the display medium of Example 4 when the applied voltage is 500 v, but the display media have a relatively low contrast when the applied voltage is +300 v. Therefore, it is important that the colored particulate material has a volume median particle diameter not greater than that of the white particulate material.

In addition, the display medium of Comparative Example 7 has a relatively low contrast compared to the display medium of Comparative Example 6 when the applied voltage is +300 v. Therefore, it is important that the white particulate material has a volume median particle diameter not less than 1/500 of the spacing of the cell.

As can be understood from the above description, the electrophoretic display liquid, display particles, display medium and display device of the present invention can reversibly display images having high contrast and visibility.

Numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An electrophoretic display liquid comprising:
   a dispersion medium;
   a white particulate material having a volume median particle diameter Dw; and
   a colored particulate material different from the white particulate material and having a color different from a color of the white particulate material and a volume median particle diameter Dc, wherein a ratio Dc/Dw is from 1/50 to 1/1 and the volume median particle diameters Dc and Dw are defined as $\exp[\Sigma ndp^3\ln(dp)/\Sigma ndp^3]$, where "n" with respect to Dc is a number of particles of the colored particulate material and with respect to Dw is a number of particles of the white particulate material, and "dp" with respect to Dc is a diameter of a particle of the colored particulate material and with respect to Dw is a diameter of a particle of the white particulate material.

2. The electrophoretic display liquid according to claim 1, wherein the white particulate material has one or more hollows therein.

3. The electrophoretic display liquid according to claim 1, wherein the volume median particle diameter Dw is from 0.2 to 6 μm.

4. The electrophoretic display liquid according to claim 1, wherein the white particulate material is an organic polymer having one or more hollows therein.

5. The electrophoretic display liquid according to claim 1, wherein the colored particulate material is titanium black.

6. The electrophoretic display liquid according to claim 1, wherein the display liquid is microencapsulated.

7. The electrophoretic display liquid according to claim 6, wherein the microencapsulated display liquid has a volume median particle diameter Dm, and wherein a ratio Dw/Dm is from 1/500 to 1/10.

8. An electrophoretic display medium comprising:
   a pair of substrates, each of said pair of substrates having an electrode on one side thereof, at least one of said pair of substrates being transparent, and said pair of substrates being opposed each other with one or more spacers therebetween to form one or more cells, wherein the electrode faces the other substrate; and
   an electrophoretic display liquid placed in the one or more cells, wherein said display liquid comprises a dispersion medium, a white particulate material having a volume median particle diameter Dw, and a colored particulate material different from the white particulate material and having a color different from a color of the white particulate material and a volume median particle diameter Dc, and wherein a ratio Dc/Dw is from 1/50 to 1/1 and the volume median particle diameters Dc and Dw are defined as $\exp[\Sigma ndp^3\ln(dp)/\Sigma ndp^3]$, where "n" with respect to Dc is a number of particles of the colored particulate material and with respect to Dw is a number of particles of the white particulate material, and "dp" with respect to Dc is a diameter of a particle of the colored particulate material and with respect to Dw is a diameter of a particle of the white particulate material.

9. The electrophoretic display medium according to claim 8, wherein one of said pair of substrates has an electrode thereon, and the other of said pair of substrates is an insulating film.

10. The electrophoretic display medium according to claim 8, wherein a distance D between inside surfaces of said substrates is from 20 to 500 times the volume median particle diameter Dw.

11. The electrophoretic display medium according to claim 8, wherein the white particulate material has one or more hollows therein.

12. The electrophoretic display medium according to claim 8, wherein the volume median particle diameter Dw is from 0.2 to 6 μm.

13. The electrophoretic display medium according to claim 8, wherein the white particulate material is an organic polymer having one or more hollows therein.

14. The electrophoretic display medium according to claim 8, wherein the colored particulate material is titanium black.

15. The electrophoretic display medium according to claim 8, wherein the display liquid is microencapsulated.

16. The electrophoretic display medium according to claim 15, wherein the microencapsulated display liquid has a volume median particle diameter Dm, and wherein a ratio Dw/Dm is from 1/500 to 1/10.

17. The electrophoretic display medium according to claim 15, wherein the microencapsulated display liquid has a volume median particle diameter Din, and wherein a ratio Dm/Dw is from 1/2 to 1/1.

18. The electrophoretic display medium according to claim 8, wherein the electrophoretic display medium further comprises:
   a print layer which is formed overlying at least a part of said pair of substrates.

19. The electrophoretic display medium according to claim 18, wherein the electrophoretic display medium further comprises:
   a print-layer protective layer which is formed overlying the print layer.

20. The electrophoretic display medium according to claim 8, wherein the electrophoretic display medium further comprises:
   an information storage portion.

21. The electrophoretic display medium according to claim 20, wherein the information storage portion comprises:
   a magnetic recording material in which information can be written and read out.

22. The electrophoretic display medium according to claim 20, wherein the information storage portion comprises:
   a memory selected from the group consisting of IC memories and optical memories.

23. The electrophoretic display medium according to claim 20, wherein the information storage portion comprises an optical information recording material from which information can be optically read out.

24. The electrophoretic display medium according to claim 20, wherein the information storage portion comprises at least one of information concerning front and back sides of the display medium and position information in the display medium.

25. An electrophoretic display medium comprising:
   a substrate having an electrode on one side thereof; and
   a display layer which is formed overlying the electrode and which comprises a microencapsulated electrophoretic display liquid having a volume median particle diameter Dm, and a binder material, wherein said display liquid comprises a dispersion medium, a white particulate material having a volume median particle diameter Dw, and a colored particulate material different from the white particulate material and having a color different from a color of the white particulate material and a volume median particle diameter Dc, and wherein a ratio Dc/Dw is from 1/50 to 1/1 and the volume median particle diameters Dc and Dw are defined as $\exp[\Sigma ndp^3\ln(dp)/\Sigma ndp^3]$, where "n" with respect to Dc is a number of particles of the colored particulate material and with respect to Dw is a number of particles of the white particulate material, and "dp" with respect to Dc is a diameter of a particle of the colored particulate material and with respect to Dw is a diameter of a particle of the white particulate material.

26. The electrophoretic display medium according to claim 25, wherein the display layer has a thickness of from once to twice the volume median particle diameter Dm.

27. The electrophoretic display medium according to claim 25, wherein the electrophoretic display medium further comprises:
   a protective layer which is formed overlying the display layer.

28. The electrophoretic display medium according to claim 27, wherein the electrophoretic display medium further comprises:
   a print layer which is formed overlying at least a part of the protective layer.

29. The electrophoretic display medium according to claim 28, wherein the electrophoretic display medium further comprises:
   a print-layer protective layer which is formed overlying the print layer.

30. The electrophoretic display medium according to claim 25, wherein the electrophoretic display medium further comprises:
   an information storage portion.

31. The electrophoretic display medium according to claim 30, wherein the information storage portion comprises a magnetic recording material in which information can be written and read out.

32. The electrophoretic display medium according to claim 30, wherein the information storage portion comprises:
   a memory selected from the group consisting of IC memories and optical memories.

33. The electrophoretic display medium according to claim 30, wherein the information storage portion comprises:
   an optical information recording material from which information can be optically read out.

34. The electrophoretic display medium according to claim 30, wherein the information storage portion comprises:
   at least one of information concerning front and back sides of the display medium and position information in the display medium.

35. An electrophoretic display device comprising:
   an electrophoretic display medium; and
   a writing device comprising an electric field forming device which applies an electric field to the display medium according to image signals to form an image in the display medium using electrophoresis, said writing device and said display medium being attachable to and detachable from each other, and said electric field forming device being capable of changing its position along the display medium when the image is formed, wherein said display medium comprises an electrophoretic display liquid comprising a dispersion medium, a white particulate material having a volume median particle diameter Dw, and a colored particulate material different from the white particulate material and having a color different from a color of the white particulate material and a volume median particle diameter Dc, and wherein a ratio Dc/Dw is from 1/50 to 1/1 and the volume median particle diameters Dc and Dw are defined as $\exp[\Sigma ndp^3 \ln(dp)/\Sigma ndp^3]$, where "n" with respect to Dc is a number of particles of the colored particulate material and with respect to Dw is a number of particles of the white particulate material, and "dp" with respect to Dc is a diameter of a particle of the colored particulate material and with respect to Dw is a diameter of a particle of the white particulate material.

36. The electrophoretic display device according to claim 35, wherein the electric field forming device is selected from the group consisting of an electrode array, an ion gun array, and a device comprising a plurality of signal electrodes, a plurality of scanning electrodes, and switching elements which are present at intersections of the plurality of signal electrodes and the plurality of scanning electrodes.

37. The electrophoretic display device according to claim 36, wherein the electric field forming device is the device comprising a plurality of signal electrodes, a plurality of scanning electrodes, and switching elements which are provided at intersections of the plurality of signal electrodes and the plurality of scanning electrodes, and wherein the device comprises a thin film transistor as the switching elements.

38. An electrophoretic displaying method comprising:

providing an electrophoretic display medium comprising an electrophoretic display liquid comprising a dispersion medium, a white particulate material different from the white particulate material and having a volume median particle diameter Dw, and a colored particulate material having a color different from the white particulate material and a volume median particle diameter Dc, and wherein a ratio Dc/Dw is from 1/50 to 1/1 and the volume median particle diameters Dc and Dw are defined as $\exp[\Sigma ndp^3 \ln(dp)/\Sigma ndp^3]$, where "n" with respect to Dc is a number of particles of the colored particulate material and with respect to Dw is a number of particles of the white particulate material, and "dp" with respect to Dc is a diameter of a particle of the colored particulate material and with respect to Dw is a diameter of a particle of the white particulate material; and imagewise applying an electric field to the display medium to form an image in the display medium using electrophoresis.

39. A reversible image displaying material comprising: an electrophoretic display medium comprising an electrophoretic display liquid comprising a dispersion medium, a white particulate material having a volume median particle diameter Dw, and a colored particulate material different from the white particulate material and having a color different from a color of the white particulate material and a volume median particle diameter Dc, and wherein a ratio Dc/Dw is from 1/50 to 1/1 and the volume median particle diameters Dc and Dw are defined as $\exp[\Sigma ndp^3 \ln(dp)/\Sigma ndp^3]$, where "n" with respect to Dc is a number of particles of the colored particulate material and with respect to Dw is a number of particles of the white particulate material, and "dp" with respect to Dc is a diameter of a particle of the colored particulate material and with respect to Dw is a diameter of a particle of the white particulate material.

40. The reversible image displaying material according to claim 39, wherein the reversible image displaying material is arranged on a device selected from the group consisting of cards, recording sheets, display devices for electric products, and signboards.

41. The reversible image displaying material according to claim 39, wherein the reversible image displaying material has flexibility.

* * * * *